United States Patent
Hiranandani et al.

(10) Patent No.: US 11,704,714 B2
(45) Date of Patent: Jul. 18, 2023

(54) REFORMULATION OF TAIL QUERIES FOR PRODUCT SEARCHES

(71) Applicant: A9.com, Inc., Palo Alto, CA (US)

(72) Inventors: Gaurush Hiranandani, Urbana, IL (US); Sumeet Katariya, Sunnyvale, CA (US); Nikhil S. Rao, San Jose, CA (US); Karthik Subbian, PaloAlto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 16/879,332

(22) Filed: May 20, 2020

(65) Prior Publication Data

US 2021/0366016 A1     Nov. 25, 2021

(51) Int. Cl.
- *G06Q 30/0601* (2023.01)
- *G06F 7/58* (2006.01)
- *G06N 3/08* (2023.01)

(52) U.S. Cl.
CPC ......... *G06Q 30/0625* (2013.01); *G06F 7/588* (2013.01); *G06N 3/08* (2013.01)

(58) Field of Classification Search
CPC ....... G06Q 30/0625; G06F 7/588; G06N 3/08
See application file for complete search history.

(56) References Cited

U.S. PATENT DOCUMENTS

| | | | | |
|---|---|---|---|---|
| 8,069,182 | B2* | 11/2011 | Pieper | G06F 16/958 707/769 |
| 9,195,834 | B1* | 11/2015 | Jakobsson | H04L 63/1483 |
| 10,332,015 | B2* | 6/2019 | Kawale | G06F 17/16 |
| 10,332,018 | B2* | 6/2019 | Cocchiara | G06N 7/01 |
| 10,404,566 | B2* | 9/2019 | Gomez-Uribe | G06Q 30/0243 |
| 10,984,058 | B2* | 4/2021 | Kveton | G06Q 30/02 |
| 11,113,745 | B1* | 9/2021 | Cetintas | G06Q 30/0625 |
| 2017/0264521 | A1* | 9/2017 | Gomez-Uribe | H04L 67/75 |
| 2018/0240024 | A1* | 8/2018 | Huang | G06N 20/00 |
| 2018/0285682 | A1* | 10/2018 | Najibi | G06V 10/803 |
| 2019/0073363 | A1* | 3/2019 | Perez | G06F 16/335 |
| 2019/0188295 | A1* | 6/2019 | Sirotkovic | G06N 3/044 |
| 2020/0125586 | A1* | 4/2020 | Rezaeian | G06N 7/005 |
| 2020/0210867 | A1* | 7/2020 | Banis | G06N 20/00 |
| 2021/0004868 | A1* | 1/2021 | Montgomery | G06Q 30/0275 |
| 2021/0089959 | A1* | 3/2021 | Ghosh | G06N 20/00 |
| 2021/0344587 | A1* | 11/2021 | Ahmed | H04L 41/149 |
| 2021/0366016 | A1* | 11/2021 | Hiranandani | G06N 20/00 |

\* cited by examiner

*Primary Examiner* — Viral S Lakhia
(74) *Attorney, Agent, or Firm* — Eversheds Sutherland (US) LLP

(57) ABSTRACT

Technologies are provided for reformulation of a tail query to a head query with the same purchase intent by mapping the tail query to the head query. In some of the technologies, a reasonable embedding can be learned on historical head queries. The embedding can then be refined by leveraging rewards generated from a persistently noisy oracle that compensates for the lack of historical behavioral signal for tail queries. Further, a contextual sampling technique that uses text-based rewards or oracle-based rewards, or both, can be implemented in order to avoid biases introduced by persistent noise in the oracle. Numerical experiments on large scale e-commerce datasets demonstrate that the provided technologies can outperform several conventional approaches to query reformulation.

19 Claims, 12 Drawing Sheets

/— 400

| Example Algorithm - Updated PIE versions using pseudo-oracle |
|---|
| Input: Initial model $PIE_0$, iterations $I$, source query batches $S_1, S_2, \ldots S_I$, target query set $\mathcal{H}$, $k$, pseudo-oracle $f(\cdot)$ |
| 1: for $i = 1, 2, \ldots, I$ do |
| 2:     Set $D_i = \phi$ (empty dataset) |
| 3:     Get embedding $h$ using $PIE_{i-1}$ for all $h \in \mathcal{H}$ |
| 4:     for source query $s \in S_i \subset \mathcal{S}$ do |
| 5:         Get embedding $s$ using $PIE_{i-1}$ |
| 6:         Obtain $k$ nearest neighbors $h_s^1, \ldots, h_s^k$ of $s$ |
| 7:         Obtain rewards from pseudo oracle $y^j = f(s, h_s^j) \; \forall j \in [k]$ |
| 8:         Append $\{(s, h_s^1, y^1), \ldots, (s, h_s^k, y^k)\}$ in $D_i$ |
| 9:     end for |
| 10:     Finetune $PIE_{i-1}$ on $D_i$ to get $PIE_i$ with early stopping |
| 11: end for |
| 12: Output: Models $PIE_1, PIE_2, \ldots, PIE_I$. |

FIG. 4

Example Algorithm - cBLIP for Query Reformulation

Input: Parameters $\beta > 0$, $\mu_0 \in \mathbb{R}^{d \times d}$, $\sigma_0^2 \in \mathbb{R}$ 1: for $t = 1, 2, \ldots, T$ do
2:     Sample $W_t \sim \mathcal{N}(\mu_{t-1}, \sigma_{t-1}^2)$
3:     Observe context $s_t$ (a source query)
4:     Choose optimal action $h_t = \arg\max_{h \in \mathcal{H}} h^T W_t s_t$
5:     Observe reward by sampling $r_t \sim \phi\left(\frac{h_t^T W_* s_t}{\beta}\right)$
6:     Set $\delta^2 = \beta^2 + (h_t \odot h_t)^T \sigma_{t-1}^2 (s_t \odot s_t)$
7:     Set $\mu_t = \mu_{t-1} + \frac{r_t}{\delta} v\left(\frac{r_t h_t^T \mu_{t-1} s_t}{\delta}\right) [h_t s_t^T \odot \sigma_{t-1}^2]$
8:     Set $\sigma_t^2 = \sigma_{t-1}^2 \left[1 - \frac{\sigma_{t-1}^2}{\delta^2 d^2} \omega\left(\frac{r_t h_t^T \mu_{t-1} s_t}{\delta}\right) [(h_t^2)^T \mathbb{1}_{d \times d} s_t^2]\right]$,
    where $v(z) = \frac{\mathcal{N}(z;0,1)}{\phi(z;0,1)}$ and $\omega(z) = v(z)(v(z) + z)$.
9: end for
10: Output: $\hat{\mu}$, $\hat{\sigma}^2$. For inference, final matrix $\hat{W} = \hat{\mu}$

FIG. 6

Top-5 reformulation candidates for source query `stringer fish'

| AvgGlove | QTD | PRFM | PIE₀ | PIE₂ | PIE₄ | PIE₂-cBLIP-PT | PIE₂-cBLIP-PTB |
|---|---|---|---|---|---|---|---|
| fish stringer | stringer | stringer fish Stringer with Fish | fish stringer | fish stringer | fish stringer | fish stringer | fish stringer |
| fish tabk | fish | stringer fish with Fish Metal | cylindrical fish tank | fish tabk | metal fish stringer | large fish stringer | large fish stringer |
| fish betta | gluceyia | stringer fish Fish Metal Hurricane | 10gallon fish tank | large fish stringer | large fish stringer | metal fish stringer | metal fish stringer |
| betta fish | kult | stringer fish Metal Hurricane Steel | 15g fish tank | kissing fish | cichlid fish | cichlid fish | cichlid fish |
| fish nori | ezvid | stringer fish Hurricane Steel Stringer | 20gallon fish tank | betta house | fish poacher | fish tabk | fish tabk |

FIG. 8A

Top-5 reformulation candidates for source query `topeak bike tent'

| AvgGlove | QTD | PIE₀ | PIE₂ | PIE₄ | PIE₂-cBLIP-PT | PIE₂-cBLIP-PTB |
|---|---|---|---|---|---|---|
| bike tent | topeak bike | bicycle pedals folding | hike and bike tent | hike and bike tent | hike and bike tent | hike and bike tent |
| bicycle tent | bike tent | thule apex swing 4 bike 9027 | bike tent | bike tent | bike tent | bike tent |
| bike canopy | tent flashlight | folding tandem bike | bicycle tent | bicycle tent | bicycle tent | bicycle tent |
| bike packing tent | misquito tent | bicycle wagon | adventure motorcycle tent | adult pit bike | motorcycle tent | motorcycle tent |
| bike camping | lavvu tent | foldable excerse bike | bicycle camping | | bicycle camping | bicycle camping |

FIG. 8B

Top-5 reformulation candidates for source query `keter outdoor trash can trash bags'

| PIE₀ | PIE₂ | PIE₄ | PIE₂-cBLIP-PT | PIE₂-cBLIP-PTB |
|---|---|---|---|---|
| 39 gallon clear drawstring outdoor garbage bags | hefty kitchen trash bags 30 gallon | medium sized trash can | hefty kitchen trash bags 30 gallon | hefty kitchen trash bags 30 gallon |
| youcopia plastic bag cabinet trash bin | 2 gallon trash bags for bathroom | divided trash can for recycle | hefty kitchen trash bags 13 gallon | hefty kitchen trash bags 13 gallon |
| outdoor rolling trash can with lid | 3 gallon trash bags for bathroom | two bin trash can | 2 gallon trash bags for bathroom | bicycle tent |
| outdoor poop trash can | 21 gallon kitchen trash bags for trash cans | basket trash can | small kitchen trash bags 4 gallon | motorcycle tent |
| waste basket trash bags 2 gallon | hefty kitchen trash bags 13 gallon | 2 bin trash can | 21 gallon kitchen trash bags for trash cans | bicycle camping |

FIG. 8C

Top-5 reformulation candidates for source query 'heart toddler earrings'

| PRFM | $PIE_0$ | $PIE_2$ | $PIE_4$ | $PIE_2$-cBLIP-PT | $PIE_2$-cBLIP-PTB |
|---|---|---|---|---|---|
| heart toddler earrings Earrings Heart Baby | heart earrings for girls | heart earrings for girls | white heart earrings | heart earrings for girls | heart earrings for girls |
| heart toddler earrings Baby for Heart | toddler pearl earrings | white heart earrings | black heart earrings | big heart earrings | rainbow heart earrings |
| heart toddler earrings Baby Screw Ring | girl pearl earrings | black heart earrings | big heart earrings | rainbow heart earrings | big heart earrings |
| heart toddler earrings for Screw Back | toddler pearl necklace | big heart earrings | red heart earrings | white heart earrings | toddler earrings |
| heart toddler earrings Screw Back Sterling | toddler choker necklace | rainbow heart earrings | small heart earrings | red heart earrings | heart earrings |

FIG. 8D

Qualitative comparison of $PIE_2$ and $PIE_2$-cBLIP-PTB. Five nearest neighbors for a given source query are shown.

| Source Query 1: jk liftgate rear window | | Source Query 2: toaster 4 slice | | Source Query 3: victorias secret robes | |
|---|---|---|---|---|---|
| $PIE_2$ | $PIE_2$-cBLIP-PTB | $PIE_2$ | $PIE_2$-cBLIP-PTB | $PIE_2$ | $PIE_2$-cBLIP-PTB |
| challenger rear window louver | jeep tj rear window | toaster 2 slice | toaster 4 slice red | victoria secret robes | victoria secret robes |
| camaro rear window louvers | jeep wrangler rear window | toaster 6 slice | toaster red 4 slice | bride squad robes | sage green robes |
| mustang rear window louvers | f150 rear window | toaster red 4 slice | toaster 4 slice white | bride tribe robes | eileen west robes |
| jeep rear window | rzr 570 rear window | toaster 4 slice red | toaster white 4 slice | eileen west robes | victoria secret robes for women |
| jeep tj rear window struts | tacoma rear window | toaster red 2 slice | toaster red 2 slice | jasmine rose robes | jasmine rose robes |

FIG. 8E

REFORMULATION OF TAIL QUERIES FOR PRODUCT SEARCHES

BACKGROUND

Retrieval of product listings in e-commerce can involve a user typing in a textual query, and an underlying search engine returning a ranked list of products in response to the query. The returned list of products can be a function of text matches between the query, product metadata, and vast amounts of anonymized and aggregated behavioral information (for example, clicks, add-to-carts, purchases, etc.) accumulated over time. The performance of the search engine is usually good on head queries (frequent queries) due to the rich availability of historical behavioral signals on that type of queries. On the tail queries (infrequent queries), however, the performance can be much worse due to the search engine's over-reliance on behavioral data. Because user query distributions can be fat-tailed, the diminished performance of the search engine can affect a significant fraction of queries.

One way to address the above issue is to reformulate the tail query to a query that yields better results from the search engine. To this end, some solutions have focused on extending or relaxing the query. These methods may work well for general search and question answering, but fall short for product search in e-commerce. Tail queries and related searches in e-commerce have several characteristics that can exacerbate that issue. First, e-commerce queries can be short, can contain a few keywords on product types or model numbers, can have fewer redundant terms, and can lack grammatical structure when compared to general search queries. Second, e-commerce searches do not factor in mentions on external websites, such as blog posts and/or articles, in order to determine what is relevant. A product search in e-commerce can be entirely self-contained and a purchase of a product can indicate relevance of a search result. Yet, for tail queries such purchase activity data can be scarce, if available at all. Third, the vast and diverse catalog for e-commerce system can change frequently, and in the absence of an exact match responsive to query, it may be desirable to show a substitute result.

Therefore, much remains to be improved in existing technologies that generate search results that identify relevant products related to the purchase intent of a tail query. Accordingly, improved technologies for reformulation of tail queries that preserves purchase intent of the tail query may be desired.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

FIG. 4 illustrates an example of an algorithm for generating a mapping model to reformulate tail queries for product search, in accordance with one or more embodiments of this disclosure.

FIG. 6 illustrates another example of an algorithm for generating a mapping model to reformulate tail queries for product search, in accordance with one or more embodiments of this disclosure.

FIG. 8A presents top-five reformulation candidates for an example source query, "stringer fish," according to two baseline reformulation models and various mapping models of this disclosure.

FIG. 8B presents top-five reformulation candidates for another example source query, "topeak bike tent," according to two baseline reformulation models and various mapping models of this disclosure.

FIG. 8C presents top-five reformulation candidates for yet another example source query, "keter outdoor trash can trash bags," according to various mapping models of this disclosure.

FIG. 8D presents top-5 reformulation candidates for still another example source query, "heart toddler earrings," according to an expansion-based reformulation model and various mapping models of this disclosure.

FIG. 8E illustrates qualitative results for two example mapping models of this disclosure, to reflect on the importance of exploration in the embedding space.

DETAILED DESCRIPTION

Figure 1:
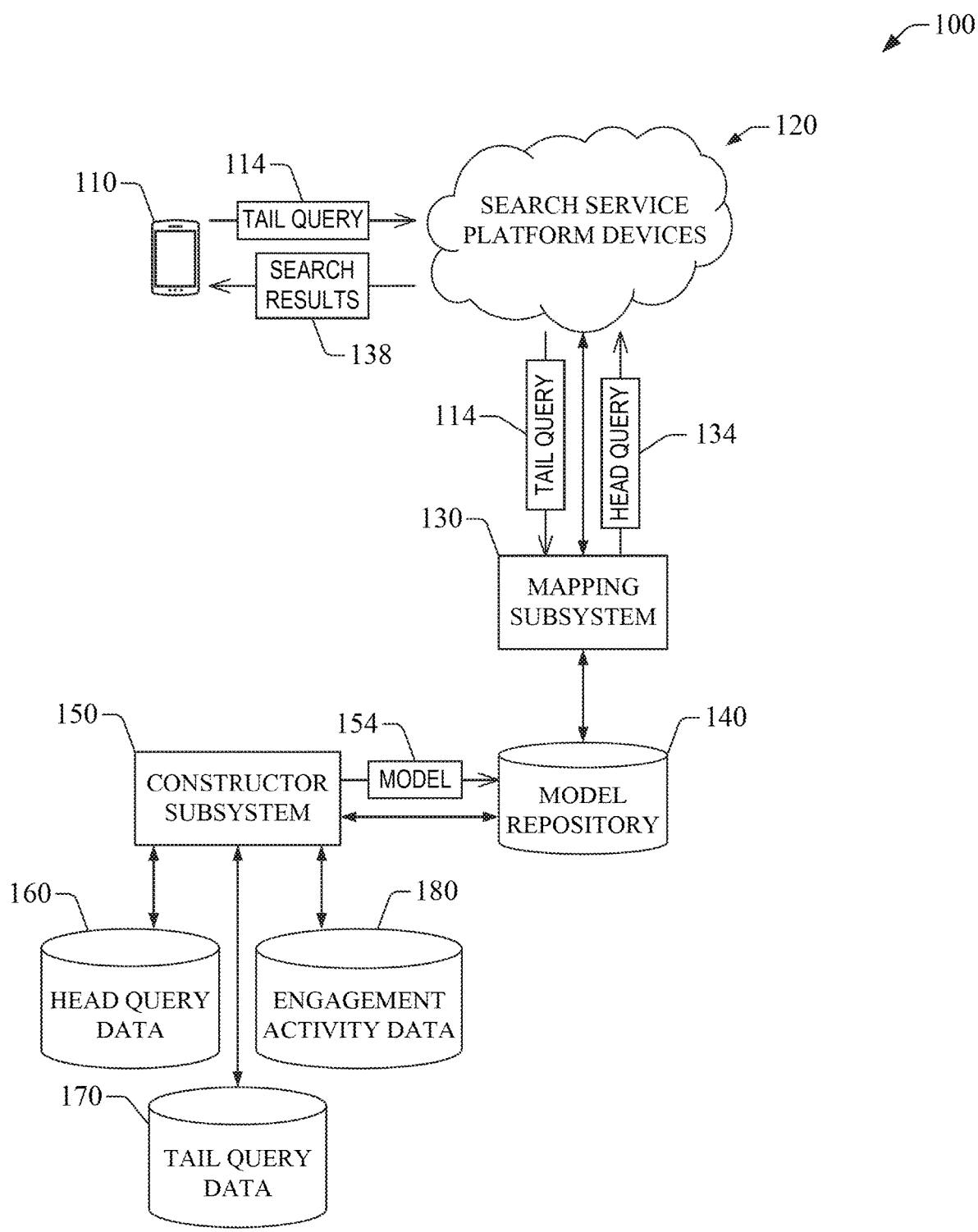
FIG. 1 illustrates an example operational environment for generating search results for a product using a tail query, in accordance with one or more embodiments of the disclosure.

The disclosure recognizes and addresses the issue of reformulating tail queries for product searches in e-commerce. Embodiments of this disclosure, individually or in combination, permit reformulating of a tail query to a head query with the same purchase intent. Head queries by nature have ample historical behavioral signals, so head queries can cause a search service platform to return a listing of products or other items that are relevant to the intended search query represented by the tail query. In addition, tail queries can be variations of a head query, due to differences in the seller's and buyers' vocabulary, spelling errors, etc. Accordingly, rather than adding terms to a tail query or removing terms from the tail query as a mechanism to reformulate the tail query, embodiments of this disclosure can map (in Euclidean space) a tail query to a head query with similar purchase intent. As a result, the technologies of this disclosure can avoid transforming a tail query into a query that has not been processed by a search service platform.

In some embodiments of the technologies of this disclosure, a reasonable embedding can be learned on historical head queries. The embedding can then be refined by leveraging rewards generated from a persistently noisy oracle that compensates for the lack of historical behavioral signal for tail queries. Further, a contextual sampling technique that uses text-based rewards or oracle-based rewards, or both, can be implemented in order to avoid biases introduced by persistent noise in the oracle. The contextual sampling techniques can be referred to as bandit techniques.

The technologies of this disclosure can be utilized in an extensive set of numerical experiments that demonstrate that the technologies outperform several conventional baseline models that rely on query expansion or relaxation, for example. It is also shown that the bandit techniques of this disclosure can improve the performance of a PIE model after the PIE model has been refined using the noisy oracle mentioned above.

In sharp contrast to conventional technologies, not only do the technologies of this disclosure address the issue of tail query reformulation as a mapping problem, but the disclosed technologies also can address at least some of the challenges of the mapping problem by means of bandit techniques methods and without using any human labeled data. Further, the bandit techniques in accordance with this disclosure permit training at scale and provide the flexibility to use either user actions (such as clicks and/or purchases) as rewards when training a mapping model online while maintaining the customer experience. Such bandit techniques also can permit, in some instances, using a combination of an oracle reward and text-based score to train the mapping model offline. Numerical experiments demonstrate that the technologies for query reformulation of this disclosure provide superior performance relative to conventional technologies for query reformulation.

Although embodiments of the disclosure are illustrated with reference to reformulation of tail queries to head queries, the PIE model and its variants disclosed herein are highly generic and can be applied to reformulation of queries from any distribution, to a query that lies in a large but predefined set. Accordingly, in this description and annexed drawings, a tail query also can be referred to as a "source query" and a head query resulting from reformulation of the tail query can be referred to as a "target query."

With reference to the drawings, FIG. 1 illustrates an example operational environment 100 for generation of product search results using tail queries, in accordance with one or more embodiments of the disclosure. The operational environment 100 includes a user device 110 that can receive a tail query 114 for a search of a product within a catalog of a digital marketplace. Input information from an end-user (not depicted in FIG. 1) can define the tail query 114. As such, the user device 114 can receive the tail query 114 by receiving such input data. The digital marketplace can include a website, such as an e-commerce website, a car dealership website, a big-box store website, or similar. The website can permit the user device 110 to present a user interface (UI) that can be used to input the tail query 114 and send the tail query 114 to a search service platform. It is noted that the user device 110 is illustrated as a smartphone simply as an illustration. The user device 110 can be embodied in other types of devices, such as a laptop computer, a handheld gaming console, an in-vehicle infotainment console, a desktop computer, wearable device, or similar.

As is illustrated in FIG. 1, the search service platform can be embodied in search service platform devices 120. Thus, the user device 110 can send the tail query 114 to a device of the search service platform devices 120. That device or another device of the search service platform devices 120 can send the tail query 114 to a mapping subsystem 130. The mapping subsystem 130 can reformulate the tail query 114. In contrast to conventional technologies, rather than relying on removal or addition of terms to the tail query 114, the mapping subsystem 130 reformulates the tail query 114 by mapping the tail query 114 to a head query 134 having similar purchase intent. To that end, the mapping subsystem 130 can apply a mapping model to the tail query 114. As a result, a group of head queries corresponding to the tail query 114 can be determined. The mapping model 130 can then assign one of the groups of head queries as the head query 134. The mapping model can be one of several mapping models retained within a model repository 140.

Thus, instead of the tail query 114, the head query 134 is used to cause the search service platform to generate a listing of products in response to the tail query 114. Accordingly, the mapping system 130 can send the head query 134 to a device of the search service platform devices 120. One or several of the search service platform device 120 can respond to the head query 134 by generating search results 138 using the head query 134. The search results 138 can include a ranked list of products, for example. A device of the search service platform device 120 can send the search results 138 to the user device 110. In some configurations, the website that permits inputting the tail query 114 also can provide one or several UIs presenting a listing of products defined by the search results 138 on user device 110.

As is illustrated in FIG. 1, the operational environment 100 can include a constructor subsystem 150 that can generate a mapping model that can be applied to the tail query 114. The mapping model can be a machine-learning model and can be generated in numerous ways. It is desired that a tail query and the head query that results from applying the machine-learning model to the tail query be both directed to a same (or at least similar) intended product. For example, the purchase intent of the tail query is to be maintained after the reformulation of tail query. Therefore, in some embodiments, the machine-learning model can be trained to generate a d-dimensional vector representation of tail queries. Such a representation can be referred to as a query embedding, and represents a tail query in a space of head queries. The training of such a machine-learning model can be supervised, using labeled data defining purchase similarity between pairs of queries, for example.

Because it can be inferred that two queries are similar in purchase intent if they consistently lead to purchase of the same items, the constructor subsystem 150 can access data defining labeled pairs of historical head queries in order to train the machine-learning model. Each pair has a first head query, a second head query, and a label. The label represents purchase similarity between the first head query and the second head query. In this disclosure, purchase similarity can be defined in terms of a matrix M of suitable historical data. The matrix M can have, in one example, a number of column vectors corresponding to a defined number of historical head queries available in a set of head queries. Each column vector can have a defined number of components that is equal to a select number of products in a catalog of products. Each one of those components identifies a number of purchases of a particular product for a particular head query. As a result, each column vector can represent a probability distribution of purchasing a particular product in the catalog, for the particular head query. A purchase similarity coefficient for a pair of head queries can be defined as the inner product between column vectors for respective queries in the pair of head queries.

It is noted that technologies and associated machine-learning models of this disclosure are not limited to purchase similarity and purchases similarity coefficients. In some embodiments, other types of engagement similarity can be utilized to train one or several of those models. For purposes of illustration, engagement similarity can refer to interaction activity between an end-user and an impression of digital content describing an item (a product or service, for example) included in search results responsive to a head query. Interaction activity can include, for example, a click on the digital content or a portion thereof (such as a call-to-action element); a viewing time interval (also referred to as dwell time); or similar. As such, an example of engagement similarity can be click similarity. Another example of engagement similarity can be viewing-time similarity.

An engagement similarity coefficient can be defined using a matrix of suitable historical data, where the matrix has matrix elements that define a magnitude of engagement activity (e.g., a number of clicks or a dwell time period) for a product included in search results for a head query. Thus, an engagement similarity coefficient for a pair of head queries can be defined, for example, as the inner product between column vectors for respective queries in the pair of head queries.

Figure 2:
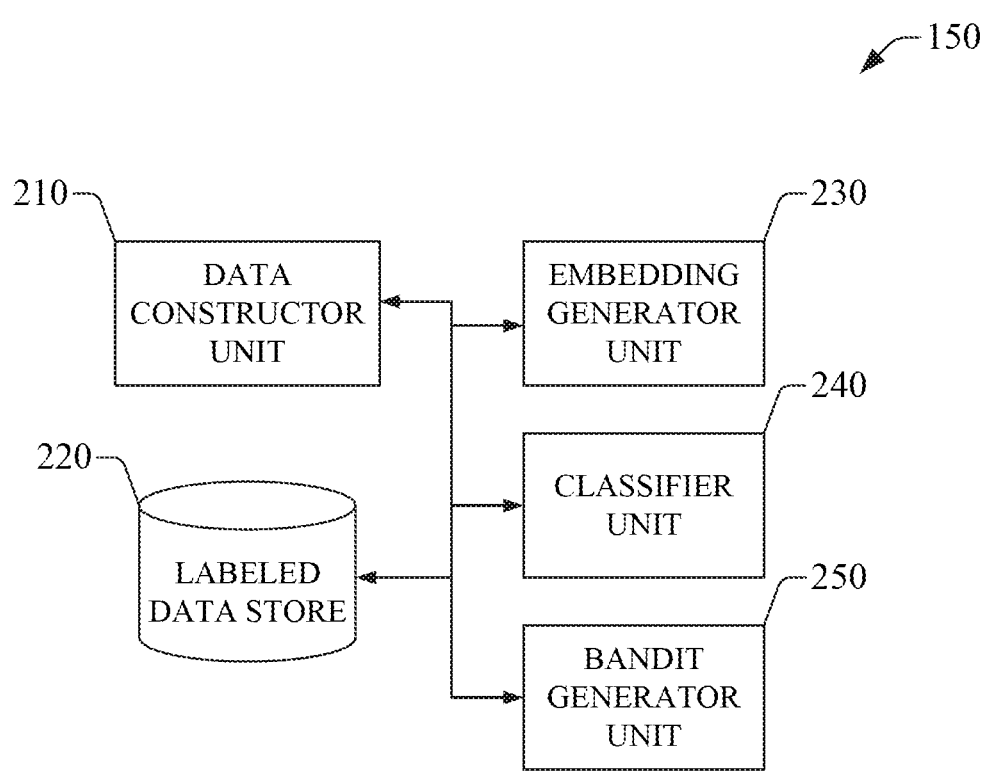
FIG. 2 illustrates an example of a system to generate a mapping model for reformulation of tail queries for product search, in accordance with one or more embodiments of the disclosure.

In some instances, accessing or otherwise determining labeled data defining labeled pairs of historical head queries can include generating such data. To that end, the constructor subsystem 150 can obtain first data identifying historical head queries from a head query data store 160. The historical head queries pertain to a defined time period. The constructor subsystem 150 also can obtain second data identifying historical product purchase events from an engagement activity data store 180. The historical product purchase events correspond to purchases of products in response to the historical head queries over the defined time period. The products pertain to a catalog in a digital marketplace. The constructor subsystem 150 can generate the matrix M using the first data and the second data. Using the matrix M, the constructor subsystem 150 can then generate purchase similarity coefficients for pairs of the historical head queries. In some embodiments, as is illustrated in FIG. 2, the constructor subsystem 150 can include a data constructor unit 210 that can generate the matrix M and purchase similarity coefficients.

In one configuration, the label pertaining to a pair of head queries can be binary, having one of two values: (i) A first value (e.g., 1) corresponding to historical head queries that are purchase similar. A pair of head queries can be deemed purchase similar when the pair has a purchase similarity coefficient that exceeds a defined threshold value. (ii) A second value (e.g., 0) corresponding to historical head queries that are purchase dissimilar; namely, the purchase similarity coefficient of such historical head queries is less than the defined threshold value. The data constructor unit 210 can generate the data defining labeled pairs of historical head queries, and can retain such data in a labeled data store 220 (FIG. 2), in some embodiments. In some embodiments, a pair of head queries can be engagement similar when the pair has an engagement similarity coefficient that exceeds a defined threshold value. Another pair of queries can engagement dissimilar when the pair has an engagement similarity coefficient that is less than the defined threshold value.

Because the number of historical head queries retained in the head query data store 160 can be large, a random pair of sampled historical head queries has a high probability of having an essentially null purchase similarity coefficient. Accordingly, rather than traversing the space of historical queries to identify pairs of head queries that are purchase dissimilar, the constructor subsystem 150 can generate random negatives for the labeled data used for training by sampling data in the head query data store 160. Specifically, in one embodiment, for every pair of queries labeled as purchase similar, the data constructor unit 210 (FIG. 2) can randomly sample a defined number of queries (four queries, five queries, six queries, etc.) from the data retained in the head query data store 160, and can pair the sample queries with one of the queries in the pair labeled as purchase similar. The data constructor unit 210 (FIG. 2) can then label the resulting pairs as purchase dissimilar.

Using the data defining labeled pairs of historical head queries, the constructor subsystem 150 can then generate a mapping model that can be applied to the tail query 114. As mentioned, the mapping model can correspond to the machine-learning model that generates a query embedding representing a tail query in a space of head queries. Because the training data incorporates historical head queries and historical purchase activity related to those queries, various attributes that define purchase intent, such as product type, brand, color, or similar, can be readily incorporated into the training. Thus, the trained mapping model is not limited to inferring purchase intent from only text included in the tail query 114.

To generate such a mapping model, in some embodiments, the constructor subsystem 150 can include an embedding generator unit 230 (FIG. 2). The embedding generator unit 230 implements the mapping model as an encoder model that encodes queries using the purchase-similarity labeled data on the head queries. In one of those embodiments, the encoder model can be Siamese transformer model. Thus, the embedding generator unit 230 can include the Siamese transformer network 300 illustrated in FIG. 3 and described in greater detail below. The embedding generator unit 230 can train the Siamese transformer network 300 using such labeled data. Simply for the sake of nomenclature, such a mapping model is herein referred to as Purchase Intent Encoder (PIE) model.

The PIE model can be generated using the labeled data described above. Accordingly, the PIE model relies on head query data and associated purchase activity data because purchase activity data for tail queries is scarce. As a result, such a PIE model may be sub-optimal in obtaining adequate tail query representations. Numerical experiments described herein illustrate as much. (See Table 1 herein below.) Accordingly, with further reference to FIG. 1, the constructor subsystem 150 can generate other mapping models to reformulate a tail query to a head query. Those other mapping models can be generated based on the PIE model described above and substitute data for purchase activity data.

The substitute data can be synthetic data generated by an oracle that utilizes a classifier model that predicts product category for a defined query. Specifically, in some configurations, the oracle can be embodied in a classification function that yields a label for a pair of queries, where the label identifies the pair of queries as being similar or dissimilar A pair of queries is determined to be similar when the classifier model predicts a same product category for each one of the queries forming the pair. In the alternative, a pair of queries is determined to be dissimilar when the classifier model predicts different product categories for respective queries forming the pair.

Accordingly, predicted product category for a query can serve as a proxy for the purchase activity corresponding to the query. The technologies can rely on product category as such a proxy because product category is one of the most important (if not the most important) attribute of an e-commerce search query. For example, generating a search result that identifies a laptop of a brand other than a specific brand is better than returning search results that fail to identify a laptop.

The constructor subsystem 150 can generate a sequence of mapping models based on the PIE model and the oracle for labeling data. Subsequent mapping models in the sequence can represent a refinement of the PIE model. The sequence can be generated iteratively. In some embodiments, in an iteration, the data constructor unit 210 (FIG. 2) can select a group of tail queries from a tail query data store 170. For each tail query in the group, the embedding generator unit 230 (FIG. 2) can apply a prior mapping model generated in a prior iteration to generate an embedding of the tail query and multiple nearest-neighbor embeddings (e.g., six nearest-neighbor embeddings, eight nearest-neighbor embeddings, ten nearest-neighbor embeddings, or similar) Using those embeddings, a classifier unit 240 (FIG. 2) can determine labels for pairs of queries corresponding to the embeddings. To that end, the classifier unit 240 can apply the oracle to each one of the pairs. The data constructor unit 210 can then generate a set of labeled data for pairs of queries, each pair including a tail query from the group of queries and a head query. The embedding generator unit 230 can then train a current mapping model using the set of labeled data.

The constructor subsystem 150 can select a particular mapping model from the sequence of mapping models for query reformulation. The particular mapping model can be selected by evaluating performance of that model with respect to one or several reformulation metrics, as is described in greater detail below. The constructor subsystem 150 can then assign the selected mapping model as the mapping model 154 that is retained in the model repository 140.

The oracle mentioned above is noisy and deterministic, which can lead to persistent (as opposed to stochastic) noise in the mapping model that is trained. To mitigate such an issue, the constructor subsystem 150 can generate a mapping model by implementing a Bayesian contextual multi-armed bandit (MAB) technique that explores diverse embeddings for tail queries. The exploration can be accomplished by means of diverse reformulations. In some implementations, the reward signal (or response data) used to train the contextual MAB offline is a combination of an oracle reward and a text-based score. The oracle reward can correspond to the product type match provided by the oracle. The text-based score can be the BLEU score of the pair formed by a tail query and the corresponding reformulated query. Augmenting the oracle reward with the BLEU score can maintain attributes beyond the product category in the mapped head query resulting from applying the mapping model to a tail query. In some embodiments, as is shown in FIG. 2, constructor subsystem 150 can include a bandit generator unit 250 that can implement the contextual MAB technique to generate a mapping model 154 in accordance with aspects of this disclosure. The bandit generator unit 250 can retain the mapping model 154 in the model repository 140.

Regardless of its type, a mapping model 154 that is generated can be retained in the model repository 140. In some embodiments, the embedding generator unit 230, the classifier unit 240, and the bandit generator unit 250 can retain the respective mapping models that those units generate.

More specifically, the constructor subsystem 150 of the operational environment 100 can cast the query reformulation problem as a mapping problem in accordance with aspects described below. As mentioned, the mapping problem can be cast formally in terms of a space of source queries and tail queries and various types of historical data. As further mentioned, solutions to the mapping problem can include the generation of an encoder model and refinements to that model. Further, other refinements to a mapping model can be accomplished by implementing bandit technique.

In connection with the formal definition of the mapping model of this disclosure, let $\mathbb{R}$ and $\mathbb{Z}_+$ denote the space of real numbers and positive integers, respectively, $[k]=\{1, 2, \ldots, k\}$ denotes the index set of size $k \in \mathbb{Z}_+$, and $\mathbb{1}$ denotes the indicator function. Further, $\mathcal{Q}$ is the space of all queries. Let s and h represent a source query and a target query, respectively. Further, let $\mathcal{Q}$ be the set of source queries, which can be infinitely large. In the present example, this may be the set of tail queries typed by users, which can be arbitrary. Similarly, let $\mathcal{H}$ be a set of head queries of a fixed size $n \in \mathbb{Z}_+$. The methods disclosed herein are general and $\mathcal{H}$ can be assumed to be a potentially large but known set of queries. A source query in $\mathcal{Q}$ may be reformulated by mapping that source query to an element of $\mathcal{H}$. Given a source query $s \in \mathcal{Q}$, an objective may be to find the best possible candidate $h_s \in \mathcal{H}$ so that the following dual objectives may be achieved: (1) Candidate $h_s$ maintains the same purchase intent as s, and (2) $h_s$, when provided to the search engine, has a much higher probability of displaying relevant items compared to s.

The set of products shown by the search engine in response to queries in $\mathcal{H}$ is denoted by $\mathcal{A}$. A matrix M that relates queries and purchases of products can be available or otherwise can be constructed. In the matrix M, the columns are queries in $\mathcal{H}$ and the rows are products in $\mathcal{A}$. The pq-th element of M represents the number of purchases of product p for the query q in a predefined time frame. Each column of M is normalized by the column sum, so that the columns represent the purchase distribution $\mathbb{P}(h)$ of queries $h_s \in \mathcal{H}$ over products.

Given $\mathcal{H}$, $\mathcal{A}$, and M, an embedding model can be constructed. For the sake of nomenclature, the embedding model can be referred to as Purchase Intent Encoder (PIE) model. The main concept leveraged to create a training dataset for PIE model is that two queries that lead to purchase of similar products should be similar in purchase intent. Thus, a purchase-similarity between queries $h_i, h_j \in \mathcal{H}$ can be defined as $\gamma(h_i, h_1) = \langle \mathbb{P}(h_i), \mathbb{P}(h_j) \rangle$, where $\langle \cdot, \cdot \rangle$ denotes the inner product between two vectors, and i and j are indices identifying respective queries. Queries $h_i$ and $h_j$ are considered to be a positive pair for training data if $\gamma(h_i, h_j) > \alpha \in (0,1)$.

Because $|\mathcal{H}|$ may be large (size in millions, in some cases), a random pair of sampled queries from $\mathcal{H}$ has a high probability of $\gamma(h_i, h_1) \approx 0$. Such a feature can be used to generate random negatives for the training data. In one embodiment, for every positively labeled pair, four queries from $\mathcal{H}$ can be randomly sampled and respectively paired with one of the queries in the positive pair. The resulting pairs may be labeled as negative. The disclosure is, of course, not limited to sampling four queries in such a fashion and other number of queries can be sampled to generate pairs that can be labeled as negative.

Figure 3:
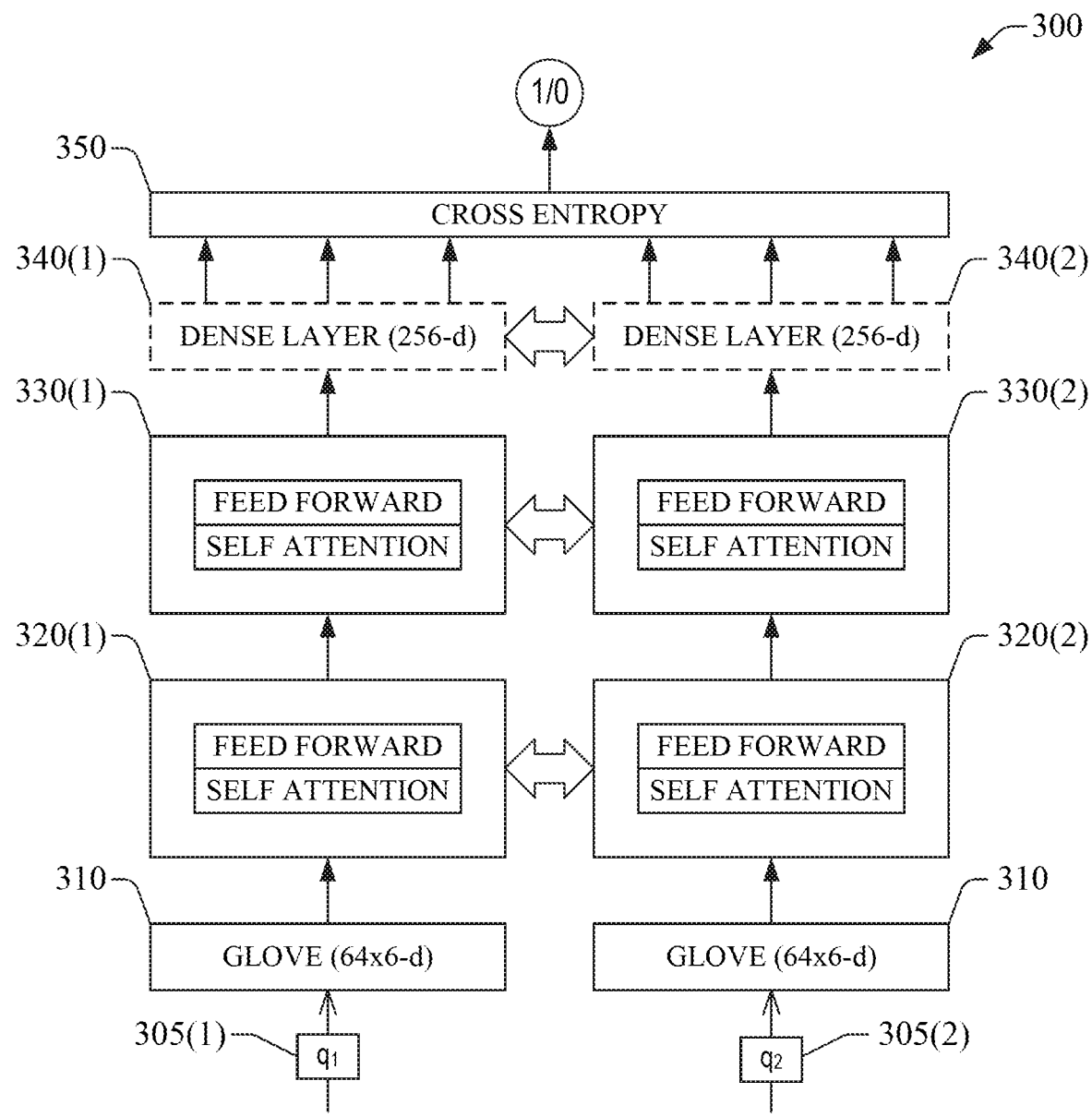
FIG. 3 illustrates an example of a mapping architecture to generate query embeddings, in accordance with one or more embodiments of this disclosure. The exemplified mapping architecture includes a Siamese network having a first arm and a second arm, each arm including two transformer layers.

Such binary labeled data for the pairs of queries can be referred to as $D_0$. The parameter $\alpha$ can be chosen conservatively and controls the number of datapoints one may have in $D_0$. In one aspect, $D_0$ can be divided into two parts: training dataset $D_{0,T}$ and cross-validation dataset $D_{0,CV}$. In one configuration, $D_{0,T}$ includes 80% of $D_0$ and $D_{0,CV}$ includes 20% of $D_0$. A transformer based PIE model can be trained using $D_{0,T}$. A schematic block diagram of the architecture is shown in FIG. 3. The PIE model takes both a first raw textual queries $q_1$ 305(1) and a second raw textual query $q_2$ 305(2) as input, with the length of each one of those queries being fixed to m tokens. In one example, m=6 tokens. Queries having a number of tokens greater than m are cut off, and queries having a number of tokens less than m are padded with <PAD> tokens. The tokens are then converted to 64-dimensional vector representation 310 (FIG. 3) from an unsupervised GLOVE model trained on a subset of $\mathcal{H} \cup \mathcal{S}$, as is described in greater detail below in connection with numerical experiments of this disclosure. For purposes of illustration, GLOVE stands for Global Vectors and represents a model for distributed word representation. Specifically, the model is an unsupervised learning algorithm for obtaining vector representations for words.

In some embodiments, with reference to FIG. 3, the PIE model may be embodied in a Siamese transformer model defining a Siamese network 300 that operates on two input query representations in tandem. Each one of those representation results from applying a GLOVE model to an input query. Specifically, a first representation results from the application of a GLOVE model 310 to the input query $q_1$ 305(1), and a second representation can be obtained by applying the GLOVE model 310 to the query $q_j$ 305(2). Each arm has two transformer layers: a first transformer layer 320($\kappa$) and a second transformer layer 330($\kappa$), where $\kappa$ denotes an arm and $\kappa$=1, 2. Each one of those transformer layers includes a self-attention layer and a feed-forward layer, and can be followed by a 256-dimensional dense layer 340($\kappa$) (encoder) shown as a dotted box in FIG. 3. Output of such a dense layer is a 256-dimensional vector representation of the queries that is used to determine the nearest neighbor(s) during inference. Nearest neighbors can be determined by analyzing Euclidean distance between 256-d vectors. Any number of nearest-neighbor embeddings can be determined (e.g., six nearest-neighbor embeddings, eight nearest-neighbor embeddings, ten nearest-neighbor embeddings, or similar Weights are tied between the first and second arms. Such an aspect of the network is represented with double-head arrows. A dense layer 350 can be attached at the end (decoder) and can train the network using a weighted binary cross-entropy loss, with weights being 4:1 in preference for positive pairs.

All the parameters discussed above can be cross validated using $D_{0,CV}$. In one aspect, the trade-off between the performance on $D_{0,CV}$ and model complexity can be measured. Because what follows is a refining of this initial model (PIE) through an oracle, emphasis can be on making PIE model as simple as possible. This ensures that a model that achieves good performance on $D_{0,CV}$ is generated, while being simple enough to need a small number of samples to fine-tune the embedding. A second advantage in simple models is the ease of inference: the search engine must be capable of providing reformulations in nearly real time.

It is noted that PIE produces reasonable embedding for head queries preserving the purchase intent of the queries. Since one of the objectives is to map tail queries to head queries, it can be necessary to account for similar purchase intent tail queries in the model. Thus, this initial PIE model may require further refinement. That initial PIE model is referred to as $PIE_0$, simply for the sake of nomenclature, The model $PIE_0$ described hereinbefore does not lend itself to generating good representations of tail queries. This is because tail queries in $\mathcal{S}$ are highly varying by nature, and can be semantically very different from head queries. As an example, consider the queries 'marathon gear for men', 'mens sneakers', and '9' joggers men'. All these queries essentially mean the same thing, and should all map to the same head query, for instance, 'running shoes for men'. In addition, queries in $\mathcal{S}$ can also be rife with spelling errors and can often be vague. Thus, the model could be refined to account for the structure in the tail queries.

One of the main challenges in refinement, however, is the lack of historical behavioral signal for queries in $\mathcal{S}$. Indeed, in an ideal scenario, a dataset of pairs $h_i$, $s_i$, where $h_i \in \mathcal{H}$, $s_i \in \mathcal{S}$ that need to be embedded close to each other could be generated. However, information about products that are typically purchased when $s_i$ is issued to a search service platform is generally unavailable. Even if such purchase activity data for tail queries would exist, it could not be ascertained if it should be treated as non-noisy due to the rarity of a tail query.

Thus, a mechanism to generate a label $y_i$ for a particular $(h_i, s_i)$ pair is desired in order to generate labeled data. While it may not be possible to infer the exact purchase intent of the tail queries, it can be possible to infer some attributes with a higher degree of accuracy. Such information may be treated as "pseudo"-purchase intent and can be used to refine the embedding from $PIE_0$. It is noted that, in some instances, such a pseudo-purchase intent can be noisy, and hence using the pseudo-purchase intent to directly train the model $PIE_0$ may yield irrelevant representations.

To that end, a pseudo-oracle $f(\bullet,\bullet): Q \times Q \rightarrow \{0,1\}$ can be implemented. The pseudo-oracle receives as input a pair of queries and returns 1 if both queries have the same pseudo-purchase intent, and 0 otherwise. The central component of such a pseudo-oracle can be a classification model trained on a separate set of human annotated queries with their broadest level of product category provided (e.g., shoes, dresses, televisions, etc.). The classification model (or classifier) can receive as input a query and can return a predicted product category for that query. Identifying product category provides considerable information regarding the purchase intent for an e-commerce query. In addition, because the categories can be broad, the underlying classifier can have reasonable performance on the tail queries as well. The pseudo-oracle $f(\bullet,\bullet)$ returns a positive label if the underlying classifier predicts same product category for both the input queries and negative label otherwise.

Because a pseudo-oracle is utilized care may be needed while constructing updated (or finetuned) models from $PIE_0$. FIG. 4 illustrates an example of an algorithm 400 that implements such a process. An objective of the refinement may be to enhance the embedding from $PIE_0$ and not completely shift the metric space to match product types. Thus, the source queries in $\mathcal{S}$ can be partitioned into equal sized, mutually exhaustive sets $\mathcal{S}_1, \mathcal{S}_2, \ldots \mathcal{S}_I \subset \mathcal{S}$. Corresponding to the set $\mathcal{S}_1$, a new training dataset $D_1$ is created as follows: for a source query $s \in \mathcal{S}_1$, the k nearest neighbors in $\mathcal{H}$ in the embedded space can be obtained using $PIE_0$, say $h_s^1, \ldots h_s^k$. Then, $y^1 = f(s, h_s^1), \ldots y^k = f(s, h_s^k)$ are obtained. The dataset $D_1$ can be used to fine-tune $PIE_0$, and obtain a new model $PIE_1$, and repeating the entire process may generate a sequence of refined models (also referred to as fine-tuned models). An advantage of creating a sequence of models $PIE_i$-instead of using entire $\mathcal{S}$ at once may be that the shift in the embedding space can be controlled in stages, guiding the model towards more meaningful representations, and also perform an early stopping when overfitting to the product type is observed. For example, in the numerical experiments of this disclosure, the sequence can be terminated at $PIE_4$ because that model places emphasis on just the product type match from the underlying classifier in $f(\bullet,\bullet)$ and loses context in comparison to $PIE_1$, $PIE_2$, and $PIE_3$. (See, for example, Table 1 hereinafter.)

Figure 5:
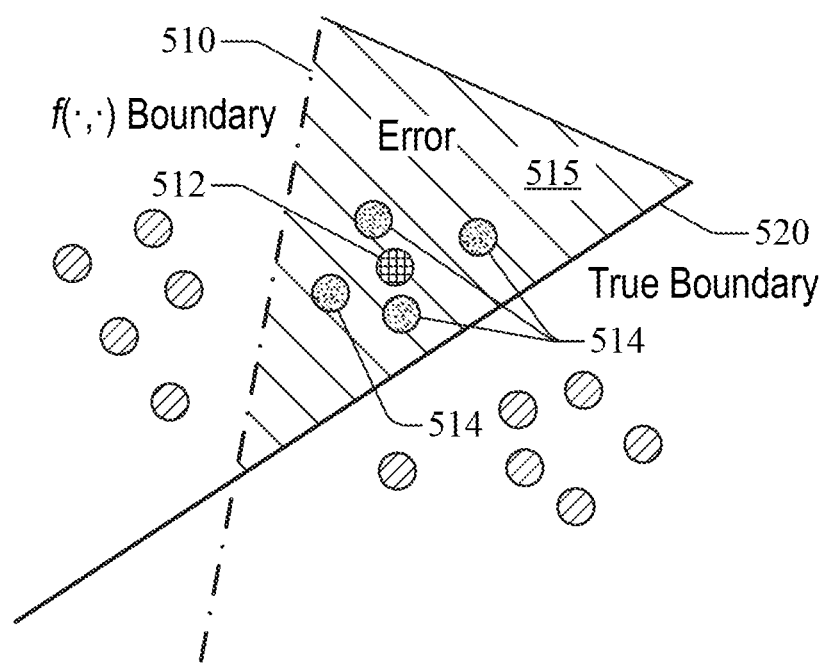
FIG. 5 schematically depicts persistent noise in a labeling function based on a machine-learning (ML) product-category classifier, in accordance with one or more embodiments of this disclosure. Solid line and dot-dashed line represent, respectively, a true classification boundary and a learned classification boundary by the ML product-category classifier. Dots represent query pair embeddings.

However, the function $f(\bullet,\bullet)$ that is used may be deterministic and noisy, as such a function may be a fixed model trained on some annotated dataset. Since the k-nearest neighbors of a source query can be very similar to each other, it is likely that if the pseudo-oracle makes an error for an $(s, h_s^j)$ pair, the pseudo-oracle can make errors for all other $(s, h_s^l)$, $l \in [k] \backslash j$. FIG. 5 schematically depicts such a phenomenon. The solid line and dot-dashed line in FIG. 5 represent, respectively, a true classification boundary 510 and a learned boundary 520 by the product category match oracle. Dots represent query pair embeddings. If a function $f()$ erroneously maps the pair $(s, h_s^j)$ (illustrated as dot 512 in FIG. 5) to the conical region 515 (labeled "Error" in FIG. 5), then s paired with the k-nearest neighbors from $\mathcal{H}$ also are likely to lie in the same region 515, giving incorrect rewards. Those k-nearest neighbors are shown with dots 514 in FIG. 5. Without intending to be bound by theory and/or modeling, such a lack of exploration in the embedding space is likely to diminish the model performance. The numerical experiments of this disclosure may be used to validate such an assertion. As is described below, bandit techniques can be used to alleviate potential issues arising from lack of exploration.

Online learning (e.g., bandits) can be used to alleviate the lack of exploration problem explained herein before. As mentioned, in this disclosure, a traditional online learning algorithm—Bayesian Linear Probit Regression (BLIP)—can be modified for query reformulation. BLIP was originally developed to obtain rewards in the form of clicks in a multi-armed bandit setting, BLIP may not be directly applicable to a query reformulation using a mapping as is described in this disclosure for the following reasons: (I) Since reformulation is desired given a source query (context), BLIP may be insufficient because BLIP does not handle contextual bandit setting. (II) BLIP proposes user clicks as rewards for the bandit, and does not account for ramifications in the model if it needs to be trained offline using pseudo-rewards.

Therefore, the technologies of this disclosure include a new technique referred to as Contextual Bayesian Linear Probit (cBLIP) regression. The cBLIP regression performs Bayesian generalized linear regression on top of the representation of the last layer of the transformer models PIE and its variants. In the following description of cBLIP, the BLIP problem in our setting is first set up, and then it is shown how to modify the update equations to handle context (e.g., a source query on which the reformulating agent has no control over). An offline reward signal also can be used in the implementation of this cBLIP technique, as is described below.

An explanation of BLIP for multi-armed bandit setting in the standard (non-contextual) recommendation problem is provided herein. Such problem can arise when displaying advertisement to end-users, for example. Given model parameters $w_* \in \mathbb{R}^d$ (user preferences) and arm features $x \in \mathbb{R}^d$, BLIP assumes binary rewards $r \in \{0,1\}$ (e.g., clicks) following a Probit model; namely:

$$\mathbb{P}(r|x; w_*) = \phi\left(\frac{r \langle x, w_* \rangle}{\beta}\right) \quad (1)$$

where $\phi(z) = \int_{-\infty}^{z} \mathcal{N}(a)da$ is the cumulative distribution function for a standard normal random variable, and $\beta > 0$ scales the steep-ness of the distribution. The linear dependence on the arm in this model makes it straightforward to derive update equations and permits applying an efficient online implementation. The model assumes an independent Gaussian prior on the weights w which is given by: $\mathbb{P}(w) = \Pi_{i=1}^{d} \mathbb{P}(w_i) = \Pi_{i=1}^{d} \mathcal{N}(\mu_i, \sigma^2)$ with parameters $\{\mu_i, \sigma^2\}_{i=1}^{d} = 1$.

BLIP samples $w_t \sim \Pi_i \mathcal{N}(\mu_{i,t}, \sigma_{i,t}^2)$ at iteration t, and finds the arm that maximizes the expected reward for $w_t$. After obtaining the reward $r_t$ in round t for the best arm, it updates the means and standard deviations $\mu_{t+1}$, $\sigma_{t+1}$ to be used for the next iteration.

In the problem of query reformulation that is addressed in this disclosure, the aim is to warp the tail queries to the head in a Euclidean metric space. Such a problem is different than the problem addressed by standard BLIP model because in this disclosure a reformulation ("arm") is desired given a source query ("context"). In other words, there exists a context provided by the user that is not in control of the reformulating agent. Because $\mathcal{H}$ is fixed, if the learned embeddings in $\mathcal{H}$ from PIE models are normalized such that $\|h\|=1$ $\forall h \in \mathcal{H}$, the following equivalence can be maintained while the tail queries are linearly mapped to head queries by means of a matrix $W_*$:

$$\arg\min_{h \in \mathcal{H}} \|h - W * s\| = \arg\max_{h \in \mathcal{H}} h^T W * s = \arg\max_{h \in \mathcal{H}} \langle h, W * s \rangle \quad (2)$$

To account for the interaction between the source query (context) and the target query (arm) through the equivalence in Eq. (2), the reward in Eq. (1) can be modified as:

$$\mathbb{P}(r | s, h; W_*) = \phi\left(\frac{\langle h, W * s \rangle}{\beta}\right) = \phi\left(\frac{\langle h^T, W * s \rangle}{\beta}\right) \quad (3)$$

where $W_* \in \mathbb{R}^{d \times d}$ since source queries and head queries have the d-dimensional representation from PIE$_i$ and may be unknown to the learning agent. Moreover, it is also assumed that the prior distribution over W is the product of $d^2$ independent normal random variables parametrized by a mean matrix $\mu \in \mathbb{R}^{d \times d}$ and a shared variance parameter $\sigma^2 \in \mathbb{R}$. The same variance for all W parameters allows uniform exploration, and it can be observed that this ensures faster convergence as well Similar to other embodiments of this disclosure, the reward that can be used can be a function of a pseudo purchase intent similarity from a noisy oracle. The noise may be countered during inference from the model. A derivation of the online update equations for cBLIP is described below, leading to the example algorithm 600 shown in FIG. 6.

The cBLIP technique iterates over the data (source query, reformulation query candidate, and reward tuples) and in each iteration, forms the true posterior distribution and then performs a Laplace approximation, via a product of joint independent normal random variables. A derivation of the update rules for cBLIP is summarized hereinafter:

In one embodiment, the bandit algorithm may be run over T rounds, given a data set $\{(h_t, s_t, r_t)\}_{t=1}^T$, the parameters $\mu$, $\sigma$ of the weight matrix need to be update, taking the context into account. For ease of notation, the outcome probability for data point at time t can be denoted by $k_t(W) := \mathbb{P}(r_t|W, s_t, h_t)$. For t=1 to T, the algorithm proceeds as follows. First, define the prior distribution over W with mean matrix $\mu_t$ and variance scalar of as $\sigma_t^2$ as $$q_t(W) := \prod_{i=1}^{d}\prod_{j=1}^{d} N(W_{tij}; u_{tij}, \sigma_t^2) \quad (4)$$

and the posterior distribution given $(h_t, s_t, r_t)$ using Bayes rule as:

$$\hat{p}_t(W \mid h_t, s_t, r_t) := \frac{\kappa_t(W)q_t(W)}{\int_W \kappa_t(W)q_t(W)dW} \quad (5)$$

Next, find the closest independent normal Gaussian approximation $\hat{q}_t(W)$ to the posterior defined by Eq. (5) by minimizing the KL divergence:

$$\mu_{t+1}, \sigma_{t+1}^2 = \underset{\hat{\mu}, \hat{\sigma}^2}{\mathrm{argmin}} KL(\hat{p}_t(W \mid h_t, s_t, r_t) \| \hat{q}_t(W)) \quad (6)$$

Assuming the reward model in Eq. (3), the update equations for the parameters $\{\mu_{ij}\}_{i,j=1}^d, \sigma^2$ are given by:

$$\delta^2 = \beta^2 + (h \odot h)^T \sigma^2 (s \odot s) \quad (7)$$

$$\mu_{new} = \mu + \frac{r}{\delta} v\left(\frac{rh^T \mu s}{\delta}\right)[hs^T \odot \sigma^2]$$

$$\sigma_{new}^2 = \sigma^2 \left[1 - \frac{\sigma^2}{\delta^2 d^2} \omega\left(\frac{rh^T \mu s}{\delta}\right)[(h \odot h)^T \mathbb{1}_{d \times d} (s \odot s)]\right],$$

where $$v(z) = \frac{N(z; 0, 1)}{\emptyset(z; 0, 1)}$$

and $\omega(z) = v(z)(v(z)+z)$. Here, $\odot$ denotes the Hadamard product, and $\mathbb{1}_{d \times d}$ is the matrix of all ones.

For the purpose of illustration, the cBLIP technique of this disclosure is illustrated in the example algorithm 600 shown in FIG. 6. The cBLIP technique maintains a posterior distribution $\mathcal{W}_t$ over $W_*$. At time t, it samples $W_t \sim \mathcal{W}_t$ and selects the head query $$h_t = \underset{h \in \mathcal{H}}{\arg\max}$$

$\langle h, W_t s_t \rangle$, as the reformulation of $s_t$. The mean, variance parameters $\{\mu_{ij}^d\}_{i,j=1}^d$, $\sigma^2$ of $\mathcal{W}_t$ are updated using the observed reward $r_t$ and Equations (7) above.

In order to implement the cBLIP technique, an initial continuous vector representation of the queries in $\mathcal{S} \cup \mathcal{H}$ is necessary. To that end, the embedding from one of the PIE$_i$ models discussed hereinbefore can be initialized, and then can normalize them in $\ell_2$-norm ($\|\cdot\|_2 = 1$). This initialization provides another advantage to cBLIP in comparison to the conventional BLIP model. Because the PIE models provide reasonable embedding space themselves, a good initialization may be available in $\mu_0 = I$ for the cBLIP technique. Here, I is the identity matrix. When initializing $\mu_0$ to an arbitraty matrix like BLIP, it can take a substantial time to converge to the right solution. It is also observed that desirable performance can be achieved when PIE$_2$ is used to initialize the vector representation for cBLIP instead of any other PIE model. Without intending to be bound by theory and/or modeling, this is not completely unexpected because PIE$_2$ manages the right balance for purchase-intent when product-type based fine tuning is applied. Such a feature is further discussed below in connection with the numerical experiments of this disclosure. Henceforth, a cBLIP model trained on embeddings from PIE$_2$ is referred to herein as PIE$_2$-cBLIP, simply for the sake of nomenclature.

In some embodiments, two types of offline rewards can be utilized for cBLIP. In this disclosure, the model with the sampled reward $r_t \sim \emptyset(f(s_t, h_t)/\beta$ can be referred to as PIE-cBLIP-PT, simply for the sake of nomenclature. Here $f(\cdot, \cdot)$ is the same product type match based classifier discussed hereinbefore. While such a model can provide superior performance compared to fine tuning-based models described above, the rewards can be modified in order to further improve the model. In some embodiments, a modified reward can include a combination of the oracle reward and the BLEU score between source query and reformulated query. Specifically, in some embodiments, it can be assumed that the reward mechanism is a sample from a distribution as follows, $$\mathbb{P}(r_t = 1 \mid s_t, h_t) = \phi\left(\frac{BLEU(s_t, h_t)f(s_t, h_t)}{\beta}\right) \quad (8)$$

where BLEU($s_t, h_t$) is the BLEU score between $s_t, h_t$. Without intending to be bound by theory and/or modeling, the reward in Eq. (8) can be used to attend the textual similarity between source query and reformulated query only if their product types match, otherwise the reward is 0. Thus, such a form of the reward ensures, for example, that the reward for the source-reformulated query pair ($s_t$='red iphone', $h_t$='red iphone case') is 0, in spite of the source query and reformulated query having overlapping terms. Simply for the sake of nomenclature, such a version of the model is referred to as PIE$_2$-cBLIP-PTB.

Using the BLEU score to augment the reward can be used to preferentially reformulate to queries that are not only matching in terms of product category intent, but also maintain attributes beyond the product type. Because the BLEU score does not depend on the order of the words in the source and target queries, the disclosed technologies do not preferentially favor queries that are syntactically the same.

In sharp contrast to conventional technologies, without intending to be bound by theory and/or modeling, it is noted that using the BLEU score in conjunction with the score from the noisy pseudo-oracle $f(\cdot,\cdot)$ permits identifying queries that satisfy both the product category intent and the textual similarity. In instances in which the pseudo-oracle is disregarded and only the BLEU score is considered, the models disclosed herein can favor reformulations that are textually similar to the source, and can potentially lose the purchase intent of the customer.

Because the pseudo-oracle in PIE$_2$-cBLIP-PT and PIE$_2$-cBLIP-PTB has persistent noise in the reward mechanism—in other words, $f(\cdot,\cdot)$ can make deterministic errors—majority voting can be performed via multiple source and target queries to obtain a good or otherwise satisfactory estimate of reward before updating the statistics in cBLIP versions. In addition, because $f(\cdot,\cdot)$ defines a pseudo-oracle, a satisfactory action (e.g., the best action or the second best action) for a source query $s_t$ can be determined by means of the following expression:

$$h_t = \arg\max_{h \in \mathcal{H}} h^T(I + \lambda \hat{W})s_t \quad (9)$$

where $\lambda$, is cross-validated and controls the alignment of the initial embedding space through product category matches and BLEU score, and $\hat{W}$ denotes the matrix learned by cBLIP versions.

As mentioned, the technologies of this disclosure can be utilized to perform several numerical experiments. Various aspects of those experiments are described below including dataset and its processing, baseline models, experiments conducted, and evaluation results.

A dataset of anonymized user logs from one month of a popular e-commerce website can be used to generate labeled data for training the various machine-learning models of this disclosure. A set of head queries $\mathcal{H}$ can be generated by considering the top $|\mathcal{H}|$=6.2 million (MM) queries (corresponding to searches that have been performed more than a defined threshold amount). For query reformulation, of particular interest are those queries that are very rare and have few or no behavioral information (clicks, purchases, etc.) from users. Because the number of such queries in such a set is exceedingly large, the size of the set is reduced by selecting a random fraction of queries searched at most twice, resulting in a second set of 2.6 MM queries. The second set is divided into two subsets $\mathcal{S}$ and $\mathcal{S}_a$, each having the same size. As is discussed herein, $\mathcal{S}$ can be used in retraining and cBLIP technique. In turn, $\mathcal{S}_a$ may be used to create a vocabulary of queries $\mathcal{V} == \mathcal{H} \cup \mathcal{S}_a$. In one configuration, there are $|\mathcal{A}|$=6.9 MM unique products that are shown by a search engine (e.g., search service platform devices 120 (FIG. 1)) in response to queries in $\mathcal{H}$.

In some embodiments, a GLOVE model is trained using $\mathcal{V}$ to learn 64-dimensional representation of the words. The training can be done via stochastic gradient descent (SGD) for 100 epochs and learning rate 0.1, in some configurations. Queries from $\mathcal{S}_a$ can be included in the training so that the model learns to embed rare words as well. Although subword based methods such as Fasttext also can be used in other configurations, the GLOVE model achieves good or otherwise satisfactory performance while being more efficient to deploy. After the GLOVE model is trained, a matrix M as is described above can be generated. A test set $\mathcal{S}_{Te}$ having 100 source queries can then be selected, where $\mathcal{S}_{Te}$ satisfies the following relationships $\mathcal{S}_{Te} \cap \mathcal{S} = \mathcal{S}_{Te} \cap \mathcal{S}_a = \emptyset$.

The initial Siamese transformer model PIE$_0$; noisy oracle based fine-tuned models PIE$_1$, PIE$_2$, PIE$_3$, and PIE$_4$; and the models trained using the contextual bandits framework PIE$_2$-cBLIP-PT and PIE$_2$-cBLIP-PTB can be compared to the following disparate baselines on the test set $\mathcal{S}_{Te}$:

(B1) AvgGlove: The query embedding is the average of the GLOVE embeddings of the tokens present in that query. The reformulation for a source query $s \in \mathcal{S}_{Te}$ is the nearest neighbor of s in $\mathcal{H}$.

(B2) BleuMatch: For a query $s \in \mathcal{S}_{Te}$, the reformulation is the query $h_t = \arg\max_{h \in \mathcal{H}}$ BLEU(s, h) where BLEU(s, h) is the BLEU score between the query strings s and h.

(B3) Query Term Dropping (QTD): This model relaxes a query by dropping terms, making the query less verbose, and hence broader in purchase intent. It is noted that the reformulated query may or may not lie within $\mathcal{H}$.)

(B4) Pseudo Relevance Feedback Model (PRFM): This is a query expansion based model widely utilized in conventional technologies. The probability of using a term e to expand a query $q_0$ is given by:

$$\mathbb{P}(e \mid q_0) = (1-\delta)\mathbb{P}^r(e \mid q_0) + \delta \sum_{a \in \mathcal{A}} \mathbb{P}(a)\mathbb{P}(e \mid a)\mathbb{P}(q_0 \mid a) \quad (10)$$

where $\mathbb{P}$ (a) is the probability of retrieving a product a (as title), assumed to be uniform over the set $\mathcal{A}$, $\mathbb{P}$ (e|a) and $\mathbb{P}$ (q$_0$|a) are the probabilities assigned by the language model obtained from a to e and $q_0$, respectively. In Eq. (9), $$\mathbb{P}^r(e \mid q_0) = \frac{tf(e, q_0)}{|q|},$$

where t$f$(e,q$_0$) is the term frequency of e in $q_0$. In some configurations, the interpolation parameter $\delta$ can be set to 0.1 because queries in $\mathcal{S}_{Te}$ are tail queries and, thus, using the same words from $q_0$ does not help in retrieving good results from the search engine (e.g., search service platform devices 120). A language model can be computed from a product (title) $a \in A$ using a Dirichlet smoothed language model: The N terms with the highest $\mathbb{P}$ (e|q$_0$) are used to expand the query. The parameter N is cross validated by means of human evaluation. Similar to the previous baselines, the reformulated query may or may not lie within $\mathcal{H}$.

Baselines B1 and B2 are string similarity based methods, baseline B3 is a relaxation method, and baseline B4 is an expansion method. Such a diverse group of baselines may be selected so that a wide variety of baselines can directly compete with the mapping-based approach to query reformulation applied by the technologies disclosed herein. Further, the scalability of the baselines also may be considered. For instance, the RL approach was not scalable in the datasets of this disclosure. Because the nearest neighbors in the head query are determined after learning the embeddings, similarity-based approaches for mapping tail queries to head queries also can be used as baselines.

For quantitative evaluation, human annotators can be relied upon because there may be no ground truth information in the tail queries to ascertain what items could be bought as a result of the reformulation. The annotation procedures are described as follows:

Annotation-I. For a source query $s \in S_{Te}$, the disclosed technologies provide a reformulation $h_s$. The top-K products $\{a_1, a_1, \ldots, a_K\}$ corresponding to the reformulated query $h_s$ can be retrieved, as returned by the e-commerce search engine. The annotators measure the relevance of each product with respect to the source query s, by evaluating whether the product $a_k$ matches the purchase intent of query s, accounting for substitutable products. That is, due to the changing nature of product catalogs, the exact item the user searches might be unavailable. In this case, the annotators checked if the shown item was a substitute (e.g., Adidas shoes instead of Nike shoes). This is commonplace in product search. In some instances, K=4 may be used, yielding 44000 human annotations for the models disclosed herein and the baselines.

Annotation-II: Given a source query s and two candidate reformulations $h_s$ and $h'_s$ from two different models $\mathcal{M}$, $\mathcal{M}'$, the annotators evaluate which one of $h_s$ or $h'_s$ better capture the purchase intent of s. Ties are dealt with equal scores for both $h_s$ and $h'_s$. For a source query $s \in S_{Te}$, the models provide a rank ordered set of reformulations $\{h_s^1, \ldots, h_s^L\}$. For example, for the embedding based methods, the top L reformulations are the L-nearest neighbors of s in $\mathcal{H}$. The judges compare $h_{s,\mathcal{M}}^1$ vs $h_{s,\mathcal{M}'}^1$ for $l \in [L]$. In other words, the annotators compare first vs first candidate, second vs second candidate, etc. from two different models. In some instances, L=3 may be used, and this process yields 1800 human annotations.

Since tail queries lack ground truth relevant products, standard metrics such as precision/recall/NDCG cannot be directly applied. Instead, the following evaluation metrics can be measured, which are simple adaptations of these metrics for tail query reformulation:

Fraction of Mismatches (FM) (a metric equivalent to precision): From Annotation I, the number of mismatched query-product pairs as evaluated by human annotators is counted and then divided by the total number of pairs; namely, $$FM := \frac{\sum s \in S_{Te} \sum_{k=1}^{K} \mathbb{1}[a_k \text{ not relevant for } s]}{K|S_{Te}|} \quad (11)$$

TABLE 1

Fraction of Mismatches (FM) and Fraction of Mismatch Dense Queries (FMDQ) obtained after reformulation from different models. Lower numbers show improved performance.

| Model | FM | FMDQ |
|---|---|---|
| AvgGlove | 0.5727 | 0.5918 |
| BlueMatch | 0.6153 | 0.6363 |
| QTD | 0.6200 | 0.6500 |
| PRFM | 0.6690 | 0.7356 |
| PIE$_0$ (ours) | 0.4622 | 0.4545 |
| PIE$_1$ (ours) | 0.4650 | 0.4545 |

TABLE 1-continued

Fraction of Mismatches (FM) and Fraction of Mismatch Dense Queries (FMDQ) obtained after reformulation from different models. Lower numbers show improved performance.

| Model | FM | FMDQ |
|---|---|---|
| PIE$_2$ (ours) | 0.4552 | 0.4444 |
| PIE$_3$ (ours) | 0.4441 | 0.4343 |
| PIE$_4$ (ours) | 0.4538 | 0.4591 |
| PIE$_2$-cBLIP-PT (ours) | 0.4148 | 0.4040 |
| PIE$_2$-cBLIP-PTB (ours) | 0.3656 | 0.3535 |

Fraction of mismatch dense queries (FMDQ) (a metric equivalent to accuracy): A reformulated query $h_s$ is treated as 'mismatch dense' if greater than or equal to K/2 items retrieved for $h_s$ are a mismatch for s. From Annotation-I, this fraction can be determined as, $$FMDQ := \frac{\sum s \in S_{Te} \left( \sum_{k=1}^{K} (\mathbb{1}[a_k \text{ irrelevant for } s]) >= K/2 \right)}{|S_{Te}|}. \quad (12)$$

Note that the queries in $S_{Te}$ do not retrieve good results from the search engine. Therefore, the above metric measures how helpful are the reformulations in retrieving the relevant results. So, anything that produces FMDQ <1 suggests improvement. Also, while comparing the quality of the models, FMDQ can be more central than just FM because from the perspective of query reformulation, FMDQ is a better evaluation criterion.

Pairwise Query Reformulation Comparison (PQRC) (a metric equivalent to NDCG on queries): From Annotation-II, reformulations from any two models $\mathcal{M}$, $\mathcal{M}'$ for source queries in $S_{Te}$ are compared by:

$$PQRC(\mathcal{M}, \mathcal{M}') := \frac{2}{|S_{Te}|} \sum_{s \in S_{Te}} \sum_{l=1}^{L} \frac{\omega_l \mathbb{1}[h_{s,\mathcal{M}}^l > h_{s,\mathcal{M}'}^l]}{\sum_{l=1}^{L} \omega_l} \quad (13)$$

where $\omega_l = 1/l$ are the weights for the candidates at the l-th rank from the models and > denotes whether or not the candidate reformulation captures strictly better purchase intent for a source query. It is noted that this metric is asymmetric in $\mathcal{M}$, $\mathcal{M}'$ and captures how good $\mathcal{M}$ is in comparison to $\mathcal{M}'$ for query reformulation.

In Table 1, mapping models in accordance with this disclosure are compared to the baselines mentioned above on FM and FMDQ. At least the following can be observed from Table 1, in no particular order:

(I) The mapping models generated using the techniques in accordance with aspects of this disclosure outperform the baselines by a remarkable margin, suggesting their utility for tail query reformulation.

(II) Even amongst the baselines, AvgGlove and BleuMatch performs better than QTD and PRFM. This clearly suggests that treating tail query reformulation as a mapping problem (for example, mapping a tail query to one of the head queries) can be advantageous in comparison to the traditional way of relaxing or expanding the tail query. On one hand, relaxations tend to lose significant intent in the query. On the other hand, expansions depend on the documents retrieved for the query, which documents can be inherently erroneous for the tail queries.

(III) Because PIE$_0$ uses a complex architecture to learn an embedding from purchase signals (e.g., data in engagement activity data store 180 (FIG. 1)) on head queries, $PIE_0$ outperforms the baselines models outlined above. It is noted that in Table 1, smaller numbers convey improved model performance. Other mapping models in accordance with this disclosure can outperform $PIE_0$ by leveraging tail query structure. Fine tuning through product type classifier can improve the performance of $PIE_0$, as is demonstrated by $PIE_1$, $PIE_2$, and $PIE_3$ outperforming $PIE_0$. Yet, without intending to be bound by theory and/or modeling, due to the persistent noise in the applied pseudo-oracle, error of the pseudo-oracle begins to propagate causing the updated model $PIE_4$ to diminish in performance. Ultimately, $PIE_2$ and $PIE_3$ perform better than other updated PIE models from product type classifiers.

(IV) The bandit-based methods $PIE_2$-cBLIP-PT and $PIE_2$-cBLIP-PTB correct for the bias introduced by the noisy pseudo-oracle and can outperform the other methods through exploration.

(V) $PIE_2$-cBLIP-PTB, the model that uses both product type pseudo-oracle and BLEU score as the reward, further outperforms $PIE_2$-cBLIP-PT. This also underscores the use of the BLEU score to maintain as well as explore the query context in addition to rewarding just the product type, which may lose other intents in the query.

Figure 7:
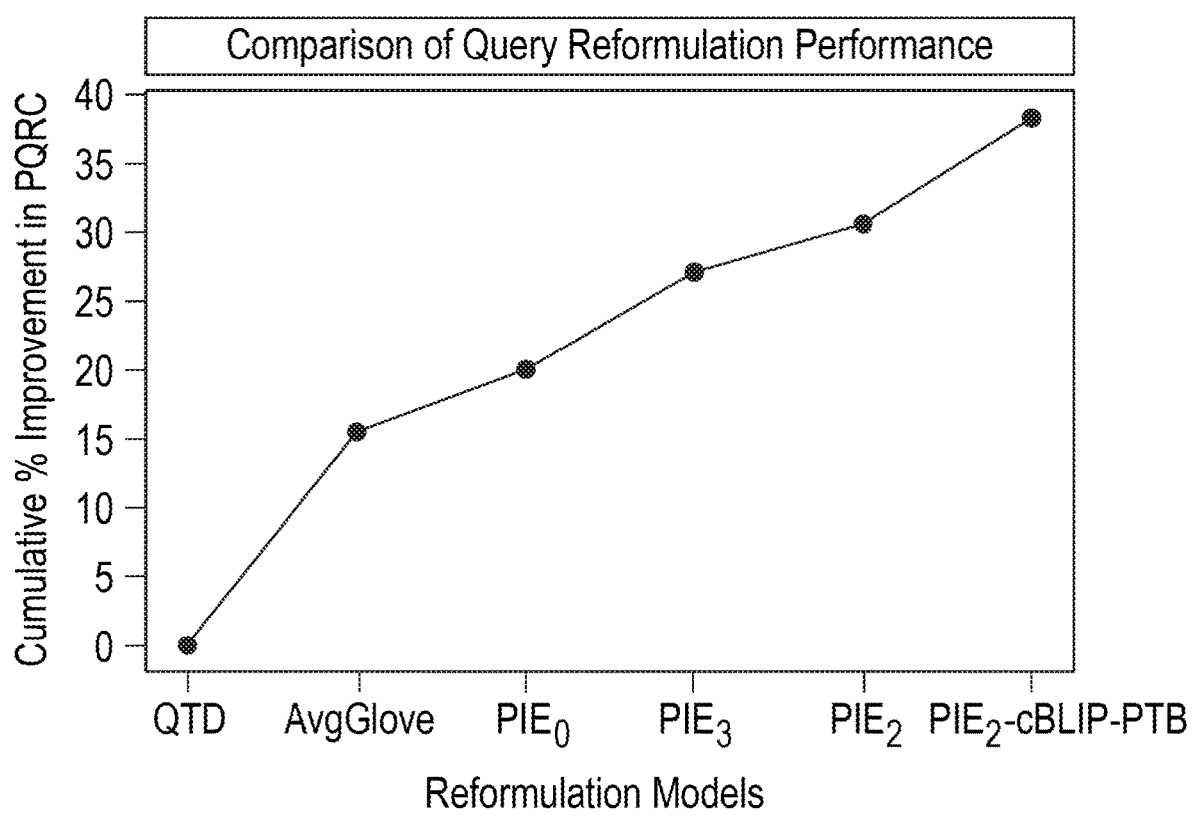
FIG. 7 illustrates query reformulation performance of various models in accordance with one or more embodiments of this disclosure. The models are rank-ordered through pairwise query reformulation comparison (PQRC) and the performance is presented as percentual cumulative improvement.

FIG. 7 illustrates the overall effectiveness of the mapping-based proposed approach in accordance with this disclosure, at each step of the tail query reformulation, including finetuning via product type based oracle and enhancing the results through bandits. The QTD model is at the x-axis. AvgGlove is 15.5% better in reformulating the queries in comparison to QTD. $PIE_2$ is 3.6% better than $PIE_3$ which is further 7% better than $PIE_0$. The best performance is achieved by model $PIE_2$-cBLIP-PTB described hereinbefore, which shows 8% improvement compared to $PIE_2$ in query reformulation. Improved performance of $PIE_2$ over $PIE_3$ on PQRC shows that $PIE_2$ provides a better purchase intent embedding than $PIE_3$. Accordingly, $PIE_2$ embedding is used in the cBLIP algorithm, instead of using $PIE_3$. Thus, it can be readily appreciated that the technologies for query reformulation of this disclosure are an improvement over conventional technologies for query reformulation, and provide superior query reformulation performance.

FIGS. 8A-8E present qualitative results of the application of the mapping-based approach in accordance with this disclosure. Depending on the string length, some tables show results from selected models. In FIG. 8A, it can be observed that the source query "stringer fish" is possibly a noisy version of the head query "fish stringer." Although AvgGlove picks up that query, other reformulations from AvgGlove are inadequate. The first set of retrieved items by PRFM for the source query are not related specifically to fish stringer. It appends stringer based tokens but still does not permit a search engine (e.g., search service platform devices 120 (FIG. 1)) to generate satisfactory results (e.g., best results, second best results, or similar) Improved performance is increasingly seen in $PIE_0$, $PIE_2$, and $PIE_4$ as the models are refined through a noisy oracle, in accordance with aspects described herein. Models $PIE_2$-cBLIP-PT and $PIE_2$-cBLIP-PTB present similar performance as that of $PIE_4$ Similar trends are observed in FIG. 8B for another example source query ("topeak bike tent").

FIG. 8C presents results for a complicated example source query, "keter outdoor trash can trash bags." The results improve by fine-tuning the models through product-type (PT) classifier based noisy oracle (compare $PIE_0$ and $PIE_2$, for example), and then degrades (compare PIE2 and PIE4, for example). First few iterations contain 'trash bags' at the top which deviate to 'trash can'. This occurs because the source query's PT as is provided by the PT Classifier is wrong: the classifier returns PT('keter outdoor trash can trash bags')='trash can'. Hence, 'trash bags' are no longer recommended, lending credence to the noise from the classifier propagating into the models as the models are fine-tuned. This matches with our observation in the quantitative results as well, with $PIE_4$ achieving inferior performance than other PIE models.

As is shown in FIG. 8D, the technologies in accordance with this disclosure can achieve better performance than baselines. However, by comparing models $PIE_0$, $PIE_2$, and $PIE_4$, it can be observed that the right product types are obtained, but the context that earrings are needed for toddlers is eventually lost. Thus, it is important to maintain both the 'raw' context of the query and the product type. $PIE_2$-cBLIP-PTB gives importance to other purchase context in the query beyond product type.

FIG. 8E illustrates qualitative results for $PIE_2$ and $PIE_2$-cBLIP-PTB, to reflect on the importance of exploration in the embedding space. It can be observed that $PIE_2$-cBLIP-PTB captures better purchase intent than $PIE_2$. For Source Query 1, although $PIE_2$ captures most of the intent behind the query, the refinement in $PIE_2$-cBLIP-PTB helps achieve better results. In Source Query 2, $PIE_2$ suggests toasters with other slice dimensions (the embedding is inaccurate), whereas $PIE_2$-cBLIP-PTB suggests toasters while retaining the context that it is needed for four slices (via careful exploration). In Source Query 3, $PIE_2$ misunderstands the user intent, while $PIE_2$-cBLIP-PTB correctly avoids the unnecessary context of 'bridal ropes.'

Figure 9:
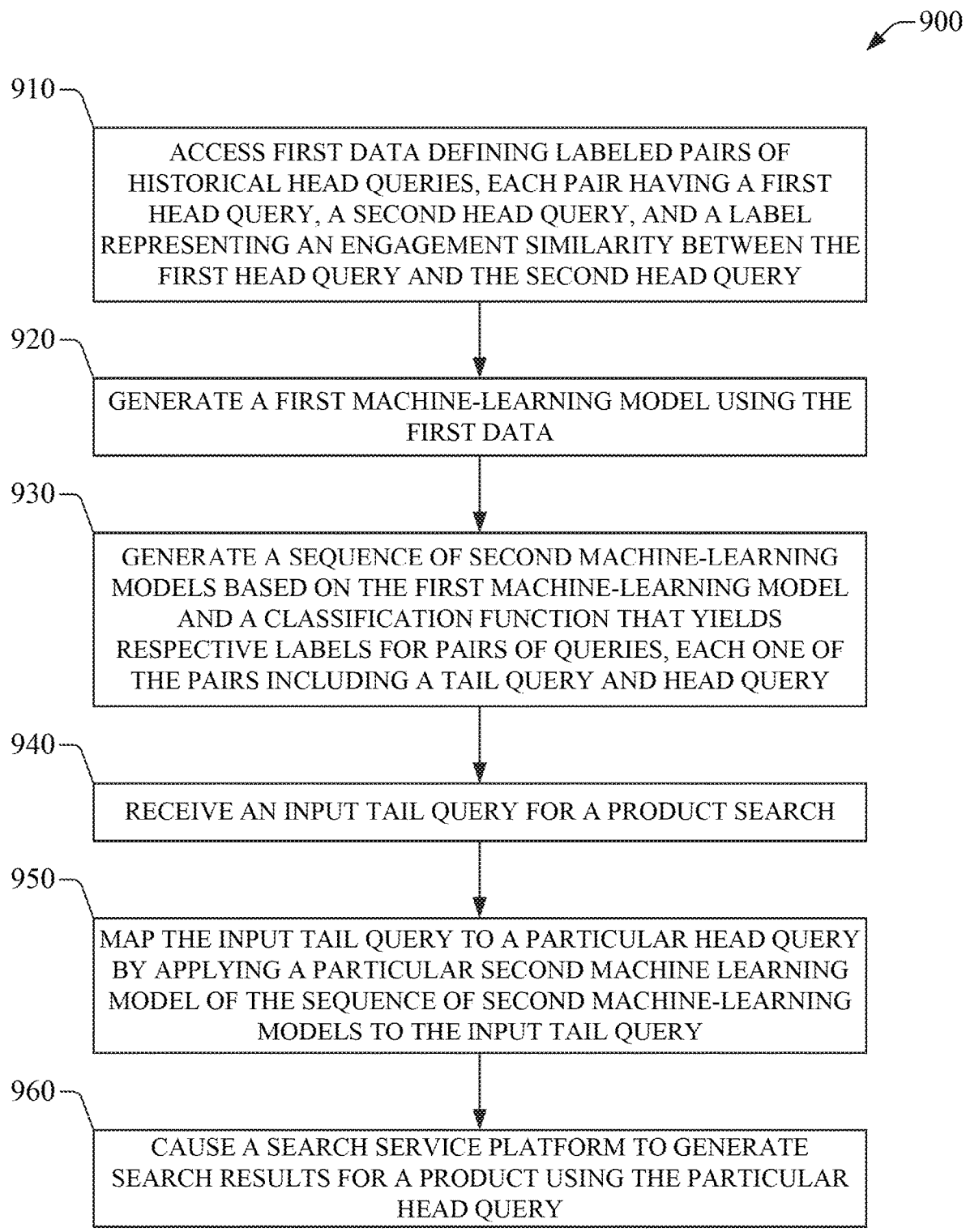
FIG. 9 illustrates an example of a method for generating search results for a product using a tail query, according to one or more embodiments of this disclosure.
Figure 10:
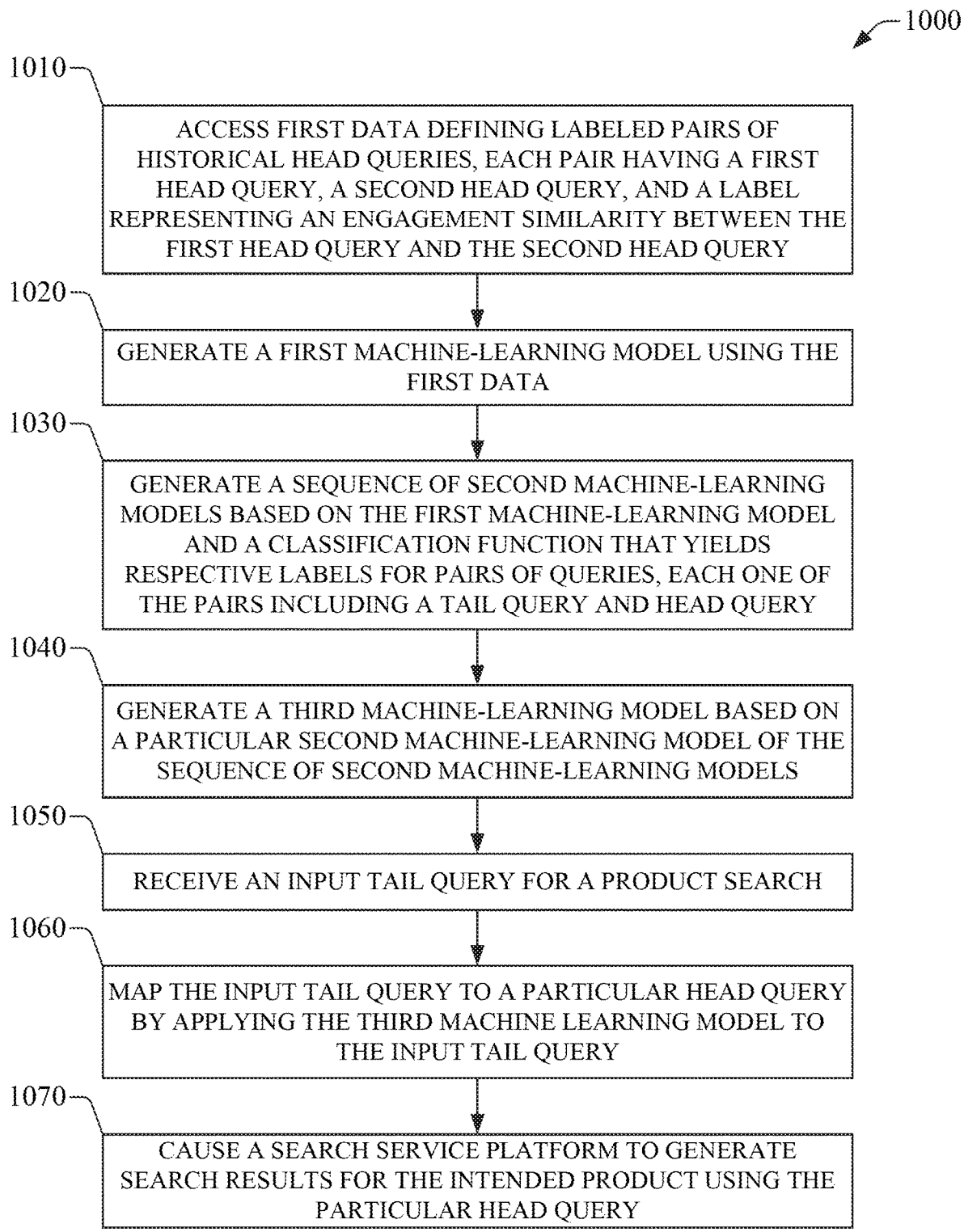
FIG. 10 illustrates an example of a method for generating search results for a product using a tail query, according to one or more embodiments of this disclosure.

In view of the aspects of the techniques disclosed herein, an example method that can be implemented in accordance with the disclosure can be more readily appreciated with reference to the flowcharts in FIG. 9 and FIG. 10. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or advantages described herein.

It is noted that the methods of the disclosure can be retained on an article of manufacture, or computer-readable medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 9 illustrates an example of a method for generating search results for a product using a tail query, according to one or more embodiments of this disclosure. The example method can be implemented, entirely or partially, by a computing system having various computing resources. The computing system has at least one processor and/or is functionally coupled to at least one processor that can implement (e.g., compile, execute, compile and execute, etc.) one or more blocks of the example method 900. The computing system also can include one or many memory devices, other types of computing resources, or a combination thereof. Such processor(s), memory device(s), and computing resource(s), individually or in a particular combination, can permit the computing system to implement the example method 900, entirely or partially. The computing resources can include operating system(s); software for configuration and/or control of a virtualized environment; firmware; CPU(s); GPU(s); TPU(s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth.

In some scenarios, one or more blocks of the example method 900 can be implemented in a distributed fashion by two or more computing devices included in the computing system. Each one of the two or more computing devices can have at least one processor or can be functionally coupled to at least one processor, where such processor(s) can implement at least one of the one or more blocks. The computing device(s) also can be memory device(s) and/or other computing resources. Regardless of the example method 900 being implemented by a distributed or non-distributed computing system, the at least one processor can be functionally coupled to at least one memory device or other types of computer-readable non-transitory storage media.

At block 910, the computing system can access first data defining labeled pairs of historical head queries, each pair having a first head query, a second head query, and a label representing an engagement similarity (e.g., purchase similarity, click similarity, or viewing-time similarity) between the first head query and the second head query. The label has one of two values: a first value corresponding to head queries having a purchase similarity factor greater than a defined threshold value, and a second value corresponding to a purchase similarity factor less than the defined threshold value.

At block 920, the computing system can generate a first machine-learning model using the first data.

At block 930, the computing system can generate a sequence of second machine-learning model based on the first machine-learning model and a classification function. The classification function yields respective labels for pairs of queries, where each one of the pairs includes a tail query and a head query. The sequence can be generated by implementing the example algorithm 400 illustrated in FIG. 4 and described above. Accordingly, in one aspects, generating the sequence can include selecting a first tail query from a subset of a space of tail queries. Generating the sequence also can include generating a first tail query by applying a prior second machine-learning model to the first tail query, and determining multiple tail queries within a space of historical tail queries. Each one of the multiple tail queries can be a nearest-neighbor query of the first tail query. Further, generating the sequence also can include generating multiples pairs of queries, each pair including the first tail query and one of the multiple head queries, and generating respective labels for the multiple pairs of queries. Generating the sequence can further include updating a labeled dataset to add the multiple pairs and the respective labels, and generating a current second machine-learning model using the updated labeled dataset.

At block 940, the computing system can receive an input tail query for a product search. Receiving the input tail query can include data defining the input tail query from a user device (e.g., device 110). The input tail query can be tail query 114 (FIG. 1) for example.

At block 950, the computing system can map the input tail query to a particular head query by applying the particular second machine learning model of the sequence of second machine-learning models to the input tail query. The particular head query can be the head query 134 (FIG. 1) for example.

At block 960, the computing system can cause a search service platform to generate search results for a product using the particular head query. The search service platform can be embodied in, or can include, the search service platform devices 120.

Blocks 910 to 930 constitute a process for generating a machine-learning model that maps tail queries to head queries. In turn, blocks 940 to 960 constitute a process for applying such machine-learning model to a product search using a particular tail query.

As is described herein, because the classification function at block 930 is deterministic, such a process for generating the machine-learning model that maps tail queries to head queries can be modified to incorporate exploration elements into the machine-learning model. The example method 1000 illustrated in FIG. 10 incorporates such elements. The computing system that implements the example method 900 also can implement, partially or entirely, the example method 1000.

In the example method 1000, blocks 1010 to 1030 are the same as blocks 910 to 930. Specifically, at block 1010, the computing system can access first data defining labeled pairs of historical head queries, each pair having a first head query, a second head query, and a label representing an engagement similarity (e.g., purchase similarity, click similarity, or viewing-time similarity) between the first head query and the second head query. As mentioned, the label has one of two values: a first value corresponding to head queries having a purchase similarity coefficient greater than a defined threshold value, and a second value corresponding to a purchase similarity coefficient less than the defined threshold value.

At block 1020, the computing system can generate a first machine-learning model using the first data.

At block 1030, the computing system can generate a sequence of second machine-learning model based on the first machine-learning model and a classification function. The classification function yields respective labels for pairs of queries, where each one of the pairs includes a tail query and a head query. The sequence can be generated by implementing the example algorithm illustrated in FIG. 4 and described above. Accordingly, in one aspects, generating the sequence can include selecting a first tail query from a subset of a space of tail queries. Generating the sequence also can include generating a first tail query by applying a prior second machine-learning model to the first tail query, and determining multiple tail queries within a space of historical tail queries. Each one of the multiple tail queries can be a nearest-neighbor query of the first tail query. Further, generating the sequence also can include generating multiples pairs of queries, each pair including the first tail query and one of the multiple head queries, and generating respective labels for the multiple pairs of queries. Generating the sequence can further include updating a labeled dataset to add the multiple pairs and the respective labels, and generating a current second machine-learning model using the updated labeled dataset.

At block 1040, the computing system can generate a third machine-learning model based on a particular second machine-learning model of the sequence of second machine-learning models. The third machine-learning model can be generated by implementing the example algorithm 600 illustrated in FIG. 6 and described above. Accordingly, in some aspects, generating the third machine-learning model can result from iteratively generating, by the computing system, a contextual machine-learning model that maps the tail query to the head query. Iteratively generating such a model can include configuring an initial matrix that linearly transforms source queries to target queries, where the initial matrix can be the identity matrix. As mentioned, such an initialization can yield better convergence performance than a random initialization. In addition, iteratively generating the third machine-learning model can include accessing a particular tail query, and generating a current matrix that linearly transforms tail queries to head queries. The current matrix can be generated, for example, by sampling a normal distribution of a current mean matrix and a current scalar variance. See, FIG. 6, for example. Further, iteratively generating the third machine-learning model also can include generating a reformulated query by determining a solution to an optimization problem with respect to an objective function based at least on the current matrix, and receiving first feedback data representing a performance of the reformulated query in causing a search service platform to yield first search results. After the feedback data is received, the computing system can update the current mean matrix and the current scalar variance using the first feedback data, the particular tail query, and the reformulated query.

Iterations can continue and, thus, iteratively generating the third machine-learning model can further include accessing a next particular source query, and generating a next matrix that linearly transforms tail queries to head queries. The next matrix can have second random real numbers and can be generated by sampling the normal distribution of the updated mean matrix and the updated scalar variance. The computing system can then generate a next reformulated query by determining a second solution to the optimization problem with respect to a second objective function based at least on the next matrix. The computing system can then receive second feedback data representing a performance of the next reformulated query in causing the search service platform to yield second search results. The computing system can then determine that the updated mean matrix and the updated scalar variance satisfy a convergence criterion, and can configure the updated mean matrix as a matrix defining an objective function that corresponds to the third machine-learning model.

At block 1050, the computing system can receive an input tail query for a product search. The input tail query can be tail query 114 (FIG. 1) for example.

At block 1060, the computing system can map the input tail query to a particular head query by applying the third machine-learning model to the input-tail query. The particular head query can be the head query 134 (FIG. 1) for example.

At block 1070, the computing system can cause a search service platform to generate search results for the intended product using the particular head query. The search service platform can be embodied in, or can include, the search service platform devices 120.

Figure 11:
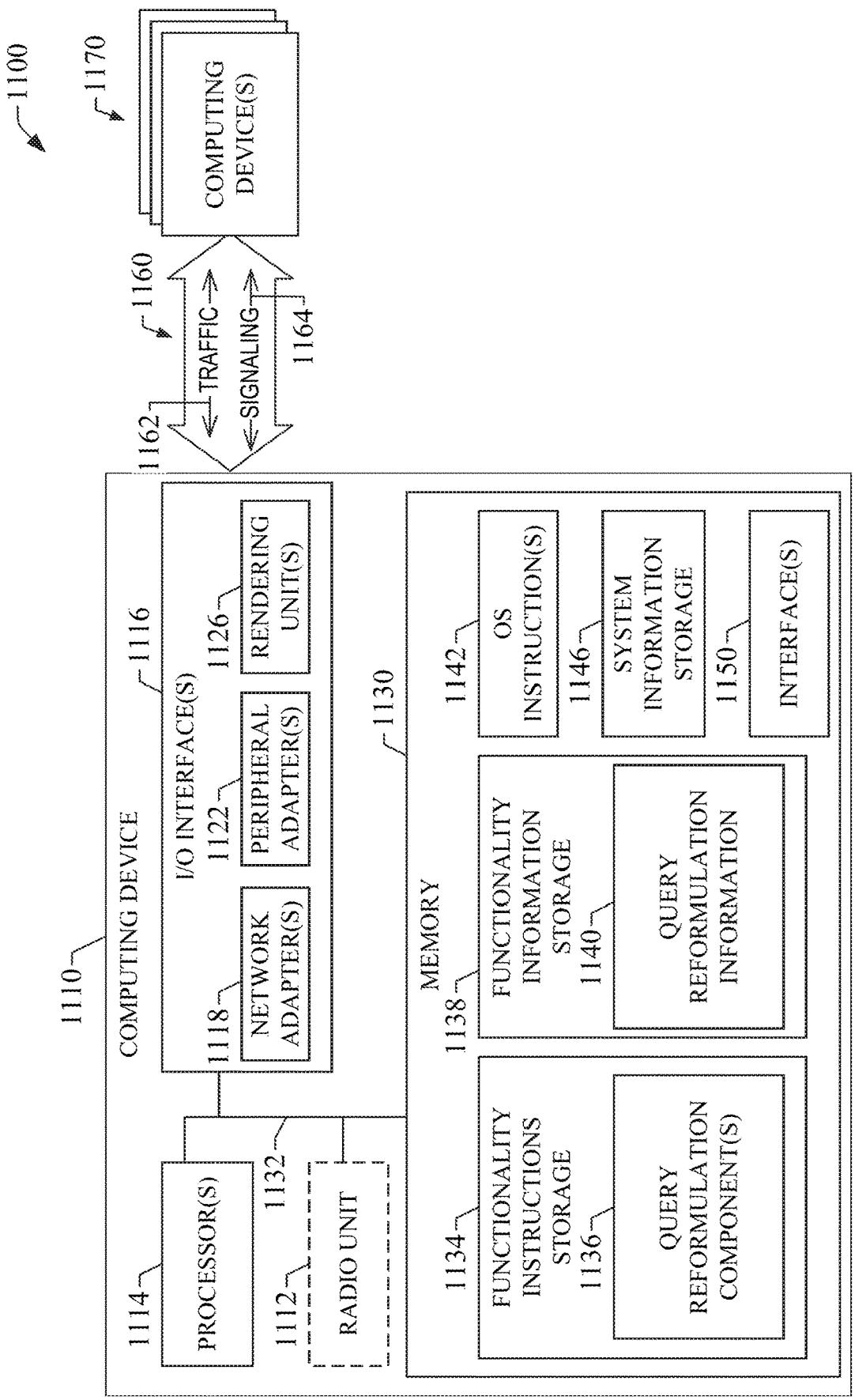
FIG. 11 illustrates an example of a computational environment for the reformulation of tail queries for product search, in accordance with one or more embodiments of the disclosure.

FIG. 11 illustrates a block diagram of an example computational environment 1100 for generation of search results using a tail query, in accordance with one or more aspects of the disclosure. The example computational environment 1100 is merely illustrative and is not intended to suggest or otherwise convey any limitation as to the scope of use or functionality of the computational environment's architecture. In addition, the illustrative computational environment depicted in FIG. 12 should not be interpreted as having any dependency or requirement relating to any one or combination of components illustrated in the example operational environments of the disclosure. The example computational environment 800 or portions thereof can embody, or can include, for example, the operational environment 100.

The computational environment 1100 represents an example implementation of the various aspects or features of the disclosure in which the processing or execution of operations described in connection with the electronic communication sessions secured and/or rendered context-aware via virtual locations disclosed herein can be performed in response to execution of one or more software components at the computing device 1110. It should be appreciated that the one or more software components can render the computing device 1110, or any other computing device that contains such components, a particular machine for electronic communication sessions secured and/or rendered context-aware via virtual locations as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example methods presented in FIG. 9 and FIG. 10. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 1110 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 1110 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the electronic communication sessions secured and/or rendered context-aware via virtual locations described herein can comprise personal computers; server computers; laptop devices; handheld computing devices, such as mobile tablets or electronic-book readers (e-readers); wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated, the computing device 1110 can comprise one or more processors 1114, one or more input/output (I/O) interfaces 1116, a memory 1130, and a bus architecture 1132 (also termed bus 1132) that functionally couples various functional elements of the computing device 1110. In certain embodiments, the computing device 1110 can include, optionally, a radio unit 1112. The radio unit 1112 can include one or more antennas and a communication processing unit that can permit wireless communication between the computing device 1110 and another device, such as one of the computing device(s) 1170. The bus 1132 can include at least one of a system bus, a memory bus, an address bus, or a message bus, and can permit exchange of information (data, metadata, and/or signaling) between the processor(s) 1114, the I/O interface(s) 1116, and/or the memory 1130, or respective functional elements therein. In certain scenarios, the bus 1132 in conjunction with one or more internal programming interfaces 1150 (also referred to as interface(s) 1150) can permit such exchange of information. In scenarios in which processor(s) 1114 include multiple processors, the computing device 1110 can utilize parallel computing.

The I/O interface(s) 1116 can permit communication of information between the computing device and an external device, such as another computing device, e.g., a network element or an end-user device. Such communication can include direct communication or indirect communication, such as exchange of information between the computing device 1110 and the external device via a network or elements thereof. As illustrated, the I/O interface(s) 1116 can comprise one or more of network adapter(s) 1118, peripheral adapter(s) 1122, and rendering unit(s) 1126. Such adapter(s) can permit or facilitate connectivity between the external device and one or more of the processor(s) 1114 or the memory 1130. For example, the peripheral adapter(s) 1122 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), Fire-Wire or IEEE-1394.

In one aspect, at least one of the network adapter(s) 1118 can functionally couple the computing device 1110 to one or more computing devices 1170 via one or more traffic and signaling pipes 1160 that can permit or facilitate exchange of traffic 1162 and signaling 1164 between the computing device 1110 and the one or more computing devices 1170. Such network coupling provided at least in part by the at least one of the network adapter(s) 1118 can be implemented in a wired environment, a wireless environment, or both. The information that is communicated by the at least one of the network adapter(s) 1118 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 1170 can have substantially the same architecture as the computing device 1110. In addition or in the alternative, the rendering unit(s) 1126 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 1110, or can permit conveying or revealing the operational conditions of the computing device 1110.

In one aspect, the bus 1132 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 1132, and all buses described herein can be implemented over a wired or wireless network connection and each of the subsystems, including the processor(s) 1114, the memory 1130 and memory elements therein, and the I/O interface(s) 1116 can be contained within one or more remote computing devices 1170 at physically separate locations, connected through buses of this form, in effect implementing a fully distributed system. In certain embodiments, such a distributed system can implement the functionality described herein in a client-host or client-server configuration in which the query reformulation component(s) 1136 or the query reformulation information 1140, or both, can be distributed between the computing device 1110 and at least one of the computing device(s) 1170, and the computing device 1110 and at least one of the computing device(s) 1170 can execute such components and/or leverage such information.

The computing device 1110 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1110, and can comprise, for example, both volatile and non-volatile media, and removable and/or non-removable media. In one aspect, the memory 1130 can comprise computer-readable media in the form of volatile memory, such as random access memory (RAM), and/or non-volatile memory, such as read-only memory (ROM).

The memory 1130 can comprise functionality instructions storage 1134 and functionality information storage 1138. The functionality instructions storage 1134 can comprise computer-accessible instructions that, in response to execution (by at least one of the processor(s) 1114), can implement one or more of the functionalities of the disclosure. The computer-accessible instructions can embody or can comprise one or more software components illustrated as query reformulation component(s) 1136. In one scenario, execution of at least one component of the query reformulation component(s) 1136 can implement one or more of the methods described herein, such as the example method 900 and the example method 1000. For instance, such execution can cause a processor (e.g., one of the processor(s) 1114)

that executes the at least one component to carry out a disclosed example method. It should be appreciated that, in one aspect, a processor of the processor(s) 1114 that executes at least one of the query reformulation component(s) 1136 can retrieve information from or retain information in one or more memory elements 1140 in the functionality information storage 1138 in order to operate in accordance with the functionality programmed or otherwise configured by the query reformulation component(s) 1136. The one or more memory elements 1140 may be referred to as query reformulation information 1140. Such information can include at least one of code instructions, information structures, or the like. For instance, at least a portion of such information structures can be indicative of a mapping or categorization of communication session and virtual locations; access rules; and/or preferences for promotional content.

In some embodiments, one or more components of the query reformulation component(s) 1136 can embody or can constitute at least one of the mapping subsystem 130 and/or the constructor subsystem 150. As such, the one or more components can operate in accordance with, and can provide the functionality of, the mapping subsystem 130 and/or the constructor subsystem 150 in accordance with aspects described in this disclosure. In other embodiments, one or more of the query reformulation component(s) 1136 in combination with at least one of the processor(s) 1114 can embody or can constitute at least one of the mapping subsystem 130 and/or the constructor subsystem 150, and can operate in accordance with, and can provide the functionality of, such units in accordance with aspects described in this disclosure.

At least one of the one or more interfaces 1150 (e.g., application programming interface(s)) can permit or facilitate communication of information between two or more components within the functionality instructions storage 1134. The information that is communicated by the at least one interface can result from implementation of one or more operations in a method of the disclosure. In certain embodiments, one or more of the functionality instructions storage 1134 and the functionality information storage 1138 can be embodied in or can comprise removable/non-removable, and/or volatile/non-volatile computer storage media.

At least a portion of at least one of the query reformulation component(s) 1136 or query reformulation information 1140 can program or otherwise configure one or more of the processors 1114 to operate at least in accordance with the functionality described herein. One or more of the processor(s) 1114 can execute at least one of the query reformulation component(s) 1136 and leverage at least a portion of the information in the functionality information storage 1138 in order to provide electronic communication sessions secured and/or rendered context-aware via virtual locations in accordance with one or more aspects described herein.

It should be appreciated that, in certain scenarios, the functionality instruction(s) storage 1134 can embody or can comprise a computer-readable non-transitory storage medium having computer-accessible instructions that, in response to execution, cause at least one processor (e.g., one or more of the processor(s) 1114) to perform a group of operations comprising the operations or blocks described in connection with the disclosed methods.

In addition, the memory 1130 can comprise computer-accessible instructions and information (e.g., data, metadata, and/or programming code instructions) that permit or facilitate the operation and/or administration (e.g., upgrades, software installation, any other configuration, or the like) of the computing device 1110. Accordingly, as illustrated, the memory 1130 can comprise a memory element 1142 (labeled operating system (OS) instruction(s) 1142) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 1110 can dictate a suitable OS. The memory 1130 also comprises system information storage 1146 having data, metadata, and/or programming code that permits or facilitates the operation and/or administration of the computing device 1110. Elements of the OS instruction(s) 1142 and the system information storage 1146 can be accessible or can be operated on by at least one of the processor(s) 1114.

It should be recognized that while the functionality instructions storage 1134 and other executable program components, such as the OS instruction(s) 1142, are illustrated herein as discrete blocks, such software components can reside at various times in different memory components of the computing device 1110, and can be executed by at least one of the processor(s) 1114. In certain scenarios, an implementation of the query reformulation component(s) 1136 can be retained on or transmitted across some form of computer-readable media.

The computing device 1110 and/or one of the computing device(s) 1170 can include a power supply (not shown), which can power up components or functional elements within such devices. The power supply can be a rechargeable power supply, e.g., a rechargeable battery, and it can include one or more transformers to achieve a power level suitable for the operation of the computing device 1110 and/or one of the computing device(s) 1170, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 1118) to connect operationally to the conventional power grid. In another aspect, the power supply can include an energy conversion component, such as a solar panel, to provide additional or alternative power resources or autonomy for the computing device 1110 and/or one of the computing device(s) 1170.

The computing device 1110 can operate in a networked environment by utilizing connections to one or more remote computing devices 1170. As an illustration, a remote computing device can be a personal computer, a portable computer, a server, a router, a network computer, a peer device or other common network node, and so on. As described herein, connections (physical and/or logical) between the computing device 1110 and a computing device of the one or more remote computing devices 1170 can be made via one or more traffic and signaling pipes 1160, which can comprise wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 1170) that are functionally coupled (e.g., communicatively linked or otherwise coupled) through a network having traffic and signaling pipes and related network elements. In a distributed computing environment, in one aspect, one or more software components (such as program modules) can be located in both a local computing device 1110 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DR-RAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

This disclosure recognizes and addresses the unique technical challenges associated with query reformulation for product search in e-commerce. The technologies of this disclosure include techniques that can reformulate a tail query to a head query with the same purchase intent by mapping the tail query to the head query. Some of the techniques can include efficient online learning procedures. After learning a reasonable embedding on historical head queries, the embedding can be refined by leveraging rewards generated from a persistently noisy oracle that compensates for the lack of historical behavioral signal for tail queries. Further, a contextual Thompson sampling based technique that uses both text-based and oracle-based reward can be implemented in order to avoid biases introduced by persistent noise in the oracle. Numerical experiments on large scale e-commerce datasets demonstrate that the technologies of this disclosure outperform several conventional approaches for query reformulation.

It is, of course, not possible to describe every conceivable combination of elements and/or methods for purposes of describing the various features of this disclosure, but it can be recognized that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
accessing, by a computing system comprising one or more processors, labeled data defining labeled pairs of historical head queries, a first pair of the labeled pairs including a first historical head query and a second historical head query, wherein the first pair is associated with a first label identifying a value that represents a purchase similarity coefficient of the first historical head query and the second historical head query, and wherein the purchase similarity coefficient corresponds to an inner product of a first vector and a second vector, the first vector defining a purchase distribution over products for the first historical head query and the second vector defining a purchase distribution over the products for the second historical head query;
training, by the computing system, using the labeled data, a first transformer model defining a Siamese neural network that maps a tail query to a head query having a same purchase intent as a source query;
generating, by the computing system, a sequence of second transformer models by iteratively updating the first transformer model;
selecting, by the computing system, a particular second transformer model of the sequence of second transformer models;
receiving, by the computing system, an input tail query for a product search; and
mapping, by the computing system, the input tail query to a defined head query by applying the particular second transformer model to the input tail query, the mapping comprising,
  generating a first vector representation of the input tail query by applying the particular second transformer model to the input tail query;
  determining multiple nearest-neighbor vector representations of the first vector representation, the multiple nearest-neighbor vector representations corresponding to respective head queries in a space of head queries;
  selecting a first nearest-neighbor vector representation of the multiple nearest-neighbor vector representations; and
  applying the particular second transformer model to the first nearest-neighbor vector representation to map the input tail query to the defined head query; and
causing, by the computing system, a search service platform to generate a listing of products using the defined head query, and to send at least one item in the listing of products to a user device.

2. The method of claim 1, wherein the a Siamese neural network comprises,
a first arm having first weight parameters;
a second arm having second weight parameters tied to the first weight parameters; and
a dense decoder layer that receives output data from the first arm and the second arm,
each one of the first arm and the second arm including,
  a first transformer layer having a first self-attention layer and a first feed-forward layer;
  a second transformer layer having a second self-attention layer and a second feed-forward layer; and
  a dense encoder layer.

3. The method of claim 1, wherein the generating the sequence comprises,
selecting a first tail query from a subset of a space of tail queries;
generating a first head query by applying a prior second transformer model to the first tail query;
determining multiple head queries within a space of historical head queries, each one of the multiple head queries being a nearest-neighbor query of the first head query;
generating multiples pairs of queries, each pair including the first tail query and one of the multiple head queries;
generating respective labels for the multiple pairs of queries, each one of the respective labels generated by applying a classification function to a pair formed by the first tail query and a respective one of the multiple head queries, a first label of the respective labels having one of a first value or a second value;
updating a labeled dataset to add the pairs and the respective labels; and
training a current second transformer model using the updated labeled dataset.

4. The method of claim 1, further comprising,
iteratively generating, by the computing system, a contextual bandit model that maps the tail query to the head query, the iteratively generating including,
accessing a particular tail query;
generating a current matrix that linearly transforms tail queries to the head queries, the current matrix having random real numbers and being generated by sampling a normal distribution of a mean matrix and a scalar variance;
generating a reformulated query by determining a solution to an optimization problem with respect to a first objective function based at least on the current matrix;
receiving first feedback data representing a performance of the reformulated query in causing the search service platform to yield a first listing of products, wherein the first feedback data includes first data defining a product category predicted by a classification function and second data defining a BLUE score for the particular tail query and the reformulated query;
updating the mean matrix and the scalar variance using the first feedback data, the particular tail query, and the reformulated query;
accessing a next particular tail query;
generating a next matrix that linearly transforms the tail queries to the head queries, the next matrix having second random real numbers and being generated by sampling the normal distribution of the updated mean matrix and the updated scalar variance;
generating a next reformulated query by determining a second solution to the optimization problem with respect to a second objective function based at least on the next matrix;
receiving second feedback data representing a performance of the next reformulated query in causing the search service platform to yield a second listing of products, wherein the second feedback data includes data defining a second product category predicted by the classification function and data defining a second BLUE score for the next particular tail query and the next reformulated query;
determining that the updated mean matrix and the updated scalar variance satisfy a convergence criterion; and
configuring the updated mean matrix as a matrix defining an objective function that corresponds to the contextual bandit model.

5. The method of claim 4, further comprising,
receiving, by the computing system, a second input tail query for a second product search; and
mapping, by the computing system, the second input tail query to a second defined head query by applying the contextual bandit model to the second input tail query, the applying comprising determining a particular solution to the optimization problem with respect to the objective function, wherein the particular solution results in the defined head query.

6. A method, comprising:
determining, by a computing system comprising one or more processors, labeled data defining labeled pairs of historical target queries, a first pair of the labeled pairs including a first historical target query and a second historical target query, and having a label representing an engagement similarity coefficient of the first historical target query and the second historical target query;
generating, by the computing system, using the labeled data, a first machine-learning model that maps a source query to a target query;
generating, by the computing system, a sequence of second machine-learning models by iteratively updating the first machine-learning model;
selecting, by the computing system, a particular second machine-learning model of the sequence of second machine-learning model models;
receiving, by the computing system, an input source query; and
mapping, by the computing system, the input source query to a defined target query by applying the particular second machine-learning model to the input source query.

7. The method of claim 6, further comprising causing, by the computing system, a search service platform to generate a group of search results using the defined target query.

8. The method of claim 6, wherein the particular second machine-learning model comprises a transformer model defining a neural network comprising, a first arm having first weight parameters;
a second arm having second weight parameters associated with the first weight parameters; and
a dense decoder layer that receives output data from the first arm and the second arm,
wherein the first arm includes;
a first transformer layer having a first self-attention layer and a first feed-forward layer;
a second transformer layer having a second self-attention layer and a second feed-forward layer; and
a first dense encoder layer;
wherein the second arm includes,
a third transformer layer having a third self-attention layer and a third feed-forward layer;
a fourth transformer layer having a fourth self-attention layer and a fourth feed-forward layer; and
a second dense encoder layer.

9. The method of claim 6, the applying comprising,
generating a first vector representation of the input source query by applying a particular second transformer model to the input source query;
determining multiple nearest-neighbor vector representations of the first vector representation, the multiple nearest-neighbor vector representations corresponding to respective target queries in a space of target queries;

selecting a first nearest-neighbor vector representation of the multiple nearest-neighbor vector representations; and applying the particular second transformer model to the first nearest-neighbor vector representation to map the input source query to the defined target query.

10. The method of claim 6, wherein the generating the sequence comprises, selecting a first source query from a subset of a space of source queries;

generating a first target query by applying a prior second machine-learning model to the first source query;

determining multiple target queries within a space of historical target queries, each one of the multiple target queries being a nearest-neighbor query of the first target query;

generating multiples pairs of queries, each pair including the first source query and one of the multiple target queries;

generating respective labels for the multiple target pairs of queries;

updating a labeled dataset to add the multiple target pairs and the respective labels; and generating a current second machine-learning model using the updated labeled dataset.

11. The method of claim 10, wherein each one of the respective labels is generated by applying a classification function to a pair formed by the first source query and a respective one of the multiple target queries, a first label of the respective labels having one of a first value or a second value.

12. The method of claim 11, wherein the classification function is based on a classifier model that receives an input query and predicts a product category for the input query, and wherein the classification function yields the first value for a first pair of queries having a same product category predicted by the classification model for each one of the queries in the first pair of queries, and yields the second value for a second pair of queries having different respective product categories predicted by the classification model for each one of the queries in the second pair of queries.

13. The method of claim 6, further comprising, iteratively generating, by the computing system, a contextual machine-learning model that maps the source query to the target query, the iteratively generating comprising configuring an initial matrix that linearly transforms source queries to target queries, the initial matrix being an identity matrix.

14. The method of claim 13, wherein the iteratively generating further comprises, accessing a particular source query;

generating a current matrix that linearly transforms the source queries to the target queries, the current matrix having random real numbers and being generated by sampling a normal distribution of a current mean matrix and a current scalar variance;

generating a reformulated query by determining a solution to an optimization problem with respect to a first objective function based at least on the current matrix;

receiving first feedback data representing a performance of the reformulated query in causing a search service platform to yield first search results;

updating the current mean matrix and the current scalar variance using the first feedback data, the particular source query, and the reformulated query;

accessing a next particular source query;

generating a next matrix that linearly transforms the source queries to the target queries, the next matrix having second random real numbers and being generated by sampling the normal distribution of the updated mean matrix and the updated scalar variance;

generating a next reformulated query by determining a second solution to the optimization problem with respect to a second objective function based at least on the next matrix;

receiving second feedback data representing a performance of the next reformulated query in causing the search service platform to yield second search results;

determining that the updated mean matrix and the updated scalar variance satisfy a convergence criterion; and configuring the updated mean matrix as a matrix defining an objective function that corresponds to the contextual machine-learning model.

15. The method of claim 14, further comprising, receiving, by the computing system, a second input source query; and mapping, by the computing system, the second input source query to a second defined target query by applying the contextual machine-learning model to the second input source query, the applying comprising determining a particular solution to the optimization problem with respect to the objective function, wherein the particular solution results in the defined target query.

16. The method of claim 14, wherein the first feedback data comprises one of, first data defining a product category predicted by a classification function and second data defining a BLUE score for the particular source query and the reformulated query; or user activity data defining one of a selection of a product in a listing of products or a purchase of the product.

17. A computing system, comprising:

at least one processor; and at least one memory device having computer-executable instructions stored thereon that, in response to execution by the at least one processor, cause the computing system at least to:

receive a source query for a product search; and generate a target query by applying a machine-learning model to map source queries to target queries, the target query having a same purchase intent as the source query and being a historical query associated with user activity records responsive to the target query, wherein generating the target query includes determining a solution to an optimization problem with respect to an objective function based at least on a matrix that linearly transform the source queries to the target queries, the matrix being a mean matrix having random numbers iteratively obtained by means of a Thompson sampling, and wherein the solution results in the target query.

18. The computing system of claim 17, the at least one memory device having further computer-executable instructions stored thereon that, in response to execution by the at least one processor, cause one or more service devices to generate a ranked list of products using the target query.

19. The computing system of claim 17, wherein generating the target query comprises, generating a first vector representation of the source query by applying the machine-learning model to the source query;

determining multiple nearest-neighbor vector representations of the first vector representation, the multiple nearest-neighbor vector representations corresponding to respective target queries;

selecting a first nearest-neighbor vector representation of the multiple nearest-neighbor vector representations; and applying the machine-learning model to the first nearest-neighbor vector representation to map the source query to the target query.

* * * * *